(12) United States Patent
Suzuki et al.

(10) Patent No.: US 12,520,633 B2
(45) Date of Patent: Jan. 6, 2026

(54) SEMICONDUCTOR LIGHT EMITTER

(71) Applicant: FUJIFILM Business Innovation Corp., Tokyo (JP)

(72) Inventors: Yoshiyuki Suzuki, Kanagawa (JP); Junichiro Hayakawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 805 days.

(21) Appl. No.: 17/709,438

(22) Filed: Mar. 31, 2022

(65) Prior Publication Data

US 2022/0406973 A1 Dec. 22, 2022

(30) Foreign Application Priority Data

Jun. 18, 2021 (JP) ................. 2021-102010

(51) Int. Cl.
*H10H 20/83* (2025.01)
*H10H 20/841* (2025.01)
*H10H 20/855* (2025.01)

(52) U.S. Cl.
CPC .......... *H10H 20/841* (2025.01); *H10H 20/83* (2025.01); *H10H 20/855* (2025.01)

(58) Field of Classification Search
CPC .................................................. H01S 5/18386
See application file for complete search history.

(56) References Cited

U.S. PATENT DOCUMENTS 10,095,152 B2 * 10/2018 Kondo ............... H01S 5/183
2019/0386465 A1 * 12/2019 Hayakawa ......... H01S 5/18311
2020/0014173 A1 * 1/2020 Lee ................... H01S 5/18388

FOREIGN PATENT DOCUMENTS

JP 2018032793 3/2018
JP 2020136655 8/2020

OTHER PUBLICATIONS

"Office Action of Japan Counterpart Application", issued on Oct. 8, 2024, with English translation thereof, pp. 1-6.

\* cited by examiner

*Primary Examiner* — Minsun O Harvey
(74) *Attorney, Agent, or Firm* — JCIPRNET

(57) ABSTRACT

A semiconductor light emitter includes a substrate, a semiconductor multilayer structure including a light emission unit that emits light in an oblique direction with respect to the substrate in an emission region in a longitudinal direction and a lateral direction orthogonal to the longitudinal direction, and a shaping optical system that shapes a luminous flux emitted from the light emission unit, in which a lens closest to the light emission unit in the shaping optical system is a cylindrical lens having positive power in the lateral direction, a front major plane of the cylindrical lens is parallel to the light emission unit and a generatrix direction of the cylindrical lens is parallel to the longitudinal direction, and the following conditional equation (1) is satisfied in a case where a distance from the light emission unit to a light incident surface of the cylindrical lens is D, a distance from the light incident surface to the front major plane of the cylindrical lens is HA, and a focal length of the cylindrical lens is f, $$D < f - HA \qquad (1).$$

20 Claims, 19 Drawing Sheets

SEMICONDUCTOR LIGHT EMITTER

CROSS-REFERENCE TO RELATED APPLICATIONS

This application is based on and claims priority under 35 USC 119 from Japanese Patent Application No. 2021-102010 filed Jun. 18, 2021.

BACKGROUND

(i) Technical Field

The present invention relates to a semiconductor light emitter.

(ii) Related Art

JP2020-136655A discloses a semiconductor multilayer structure, in relation to the semiconductor multilayer structure using a distributed Bragg reflector waveguide, having a light source unit that emits laser light and a light amplification unit that includes an active region formed on a substrate and formed in an extended manner from the light source unit in a direction set in advance along a surface of the substrate, amplifies propagation light propagating in the direction set in advance from the light source unit, and emits the amplified propagating light in an oblique direction with respect to the substrate surface as emission light.

SUMMARY

The light emitted from a light emission unit of the semiconductor multilayer structure as described above has characteristics of a plane wave in a longitudinal direction (same as the extended direction) and characteristics of a spherical wave in a lateral direction. Therefore, a luminous flux emitted from the light emission unit of the semiconductor multilayer structure becomes substantially parallel light in the longitudinal direction, whereas the luminous flux becomes diffused light in the lateral direction as compared with the light from the longitudinal direction. Therefore, the luminous flux emitted from the semiconductor multilayer structure may not be effectively used unless the luminous flux emitted from the semiconductor multilayer structure in the lateral direction is once shaped into the parallel light. Further, the light characteristics are different between the light emitted in the oblique direction and light emitted in a perpendicular direction.

Aspects of non-limiting embodiments of the present disclosure relate to a semiconductor light emitter capable of shaping, in an oblique direction, light in a lateral direction of a luminous flux emitted from a semiconductor multilayer structure.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a semiconductor light emitter invention includes a substrate, a semiconductor multilayer structure including a light emission unit that emits light in an oblique direction with respect to the substrate in an emission region in a longitudinal direction and a lateral direction orthogonal to the longitudinal direction, and a shaping optical system that shapes a luminous flux emitted from the light emission unit, in which a lens closest to the light emission unit in the shaping optical system is a cylindrical lens having positive power in the lateral direction, a front major plane of the cylindrical lens is parallel to the light emission unit and a generatrix direction of the cylindrical lens is parallel to the longitudinal direction, and the following conditional equation (1) is satisfied in a case where a distance from the light emission unit to a light incident surface of the cylindrical lens is D, a distance from the light incident surface to the front major plane of the cylindrical lens is HA, and a focal length of the cylindrical lens is f, $$D < f - HA \qquad (1).$$

BRIEF DESCRIPTION OF THE DRAWINGS

Exemplary embodiment(s) of the present invention will be described in detail based on the following figures, wherein:

FIG. 7A is a diagram showing a state of both in a longitudinal direction, and FIG. 7B is a diagram showing the state of both in a lateral direction;

FIG. 8A is a diagram showing a state of both in the longitudinal direction, and FIG. 8B is a diagram showing the state of both in the lateral direction;

FIG. 9A is a diagram showing a state of both in the longitudinal direction, and FIG. 9B is a diagram showing the state of both in the lateral direction;

DETAILED DESCRIPTION

Hereinafter, exemplary embodiments of the present disclosure will be described in detail with reference to the drawings.

First Exemplary Embodiment

Figure 1:
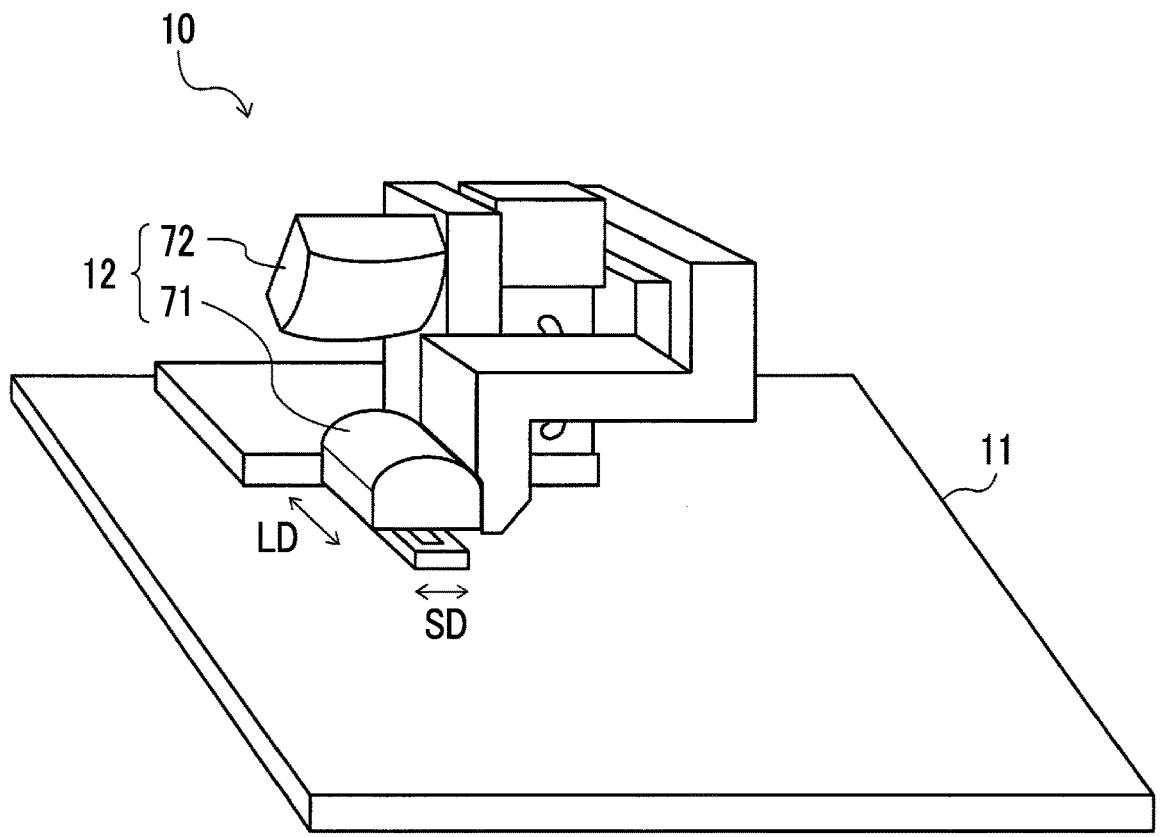
FIG. 1 is a schematic configuration diagram of a semiconductor light emitter according to a first exemplary embodiment.

A semiconductor light emitter 10 according to the present exemplary embodiment will be described with reference to FIG. 1. FIG. 1 is a schematic configuration diagram of the semiconductor light emitter 10.

As shown in FIG. 1, the semiconductor light emitter 10 includes a substrate 11, a semiconductor multilayer structure 20 including a light emission unit that emits, in an oblique direction with respect to the substrate 11, light in an emission region in a longitudinal direction LD and in a lateral direction SD orthogonal to the longitudinal direction LD, and a shaping optical system 12 that shapes a luminous flux emitted from the light emission unit.

As the semiconductor multilayer structure 20, any element may be used as long as the element is the semiconductor multilayer structure including the light emission unit that emits, in the oblique direction with respect to the substrate 11, light in the emission regions in the longitudinal direction LD and in the lateral direction SD orthogonal to the longitudinal direction LD. In the present exemplary embodiment, the semiconductor multilayer structure 20 uses, as an example, a surface-emitting semiconductor multilayer structure using a distributed Bragg reflector (DBR) waveguide.

Figure 2:
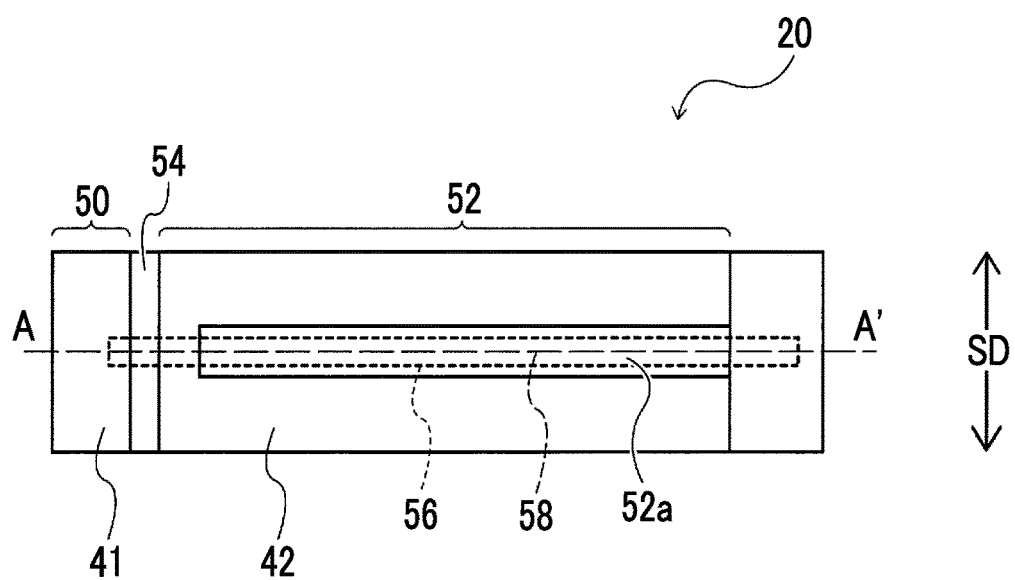
FIG. 2 is a plan view of the semiconductor multilayer structure according to the first exemplary embodiment.
Figure 3:
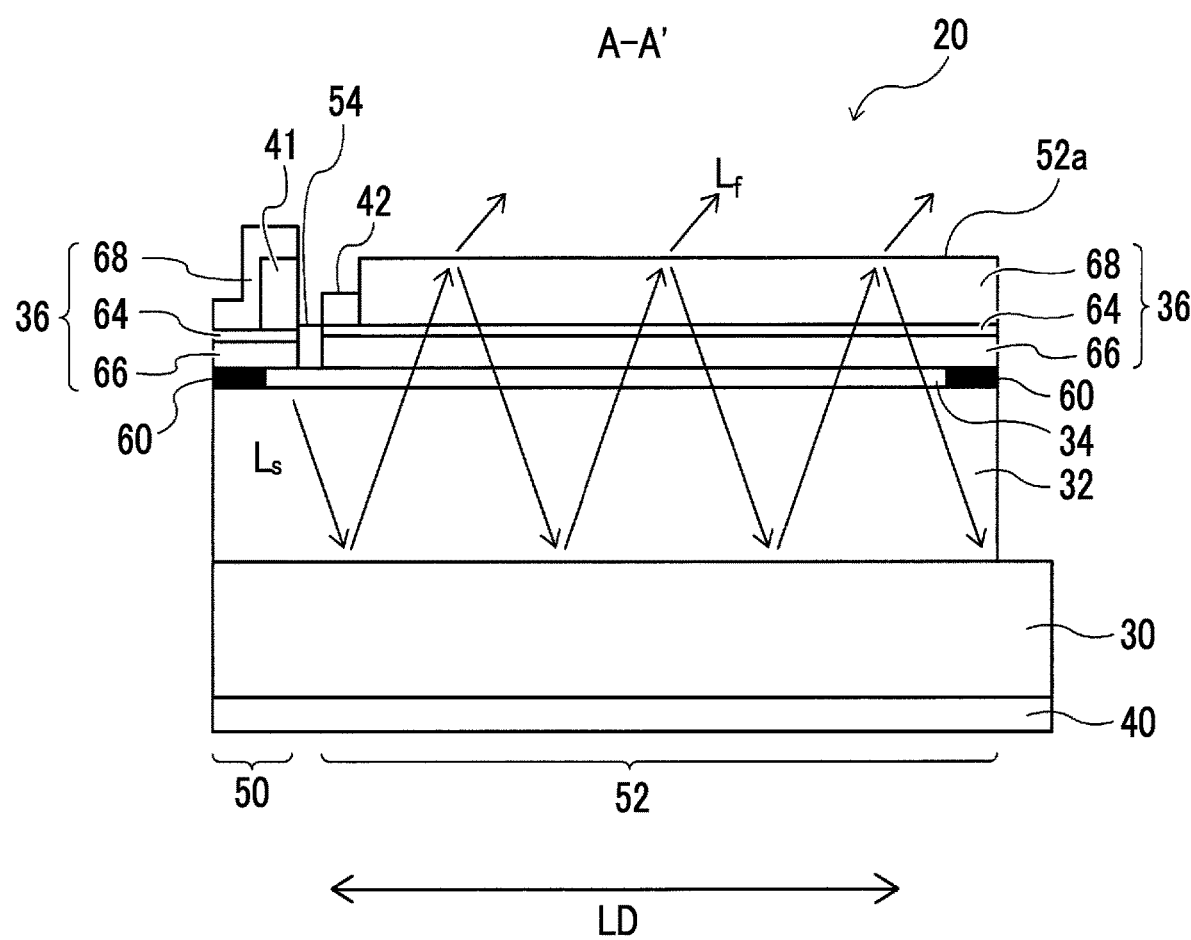
FIG. 3 is a cross-sectional view taken along a line A-A' shown in FIG. 2.

FIG. 2 is a plan view of the semiconductor multilayer structure 20, and FIG. 3 is a cross-sectional view taken along a line A-A' shown in FIG. 2. As shown in FIGS. 2 and 3, the semiconductor multilayer structure 20 includes a light emitting unit 50 and a light amplification unit 52 that is extended from the light emitting unit 50 in the longitudinal direction LD and propagates the light in the longitudinal direction LD to amplify the light.

The light emitting unit 50 is a portion that generates seed light Ls and is configured as a vertical cavity surface emitting laser (VCSEL) in the present exemplary embodiment. As shown in FIG. 3, the seed light Ls generated from the light emitting unit 50 propagates the light toward the light amplification unit 52.

The light amplification unit 52 has a function of amplifying and emitting the seed light Ls, which is the light generated by the light emitting unit 50. The light amplification unit 52 according to the present exemplary embodiment is a surface-emission light amplification unit using a GaAs-based distributed Bragg reflector waveguide (hereinafter "DBR waveguide"), as an example.

The semiconductor multilayer structure 20 is configured to include a lower DBR 32, an active region 34, a non-conductive region 60, an upper DBR 36, an insulating portion 54, a first P electrode 41, and a second P electrode 42, which are formed on a base layer 30, and an N electrode 40 formed on a back surface of the base layer 30.

In the present exemplary embodiment, the base layer 30 is an n-type GaAs substrate, and the N electrode 40 is provided on the back surface of the base layer 30. On the other hand, the lower DBR 32 according to the present exemplary embodiment is n-type, and the upper DBR 36 is p-type as a whole.

The lower DBR 32 is paired with the upper DBR 36 described below to configure a light source that generates the light in the light emitting unit 50 and to configure a resonator that amplifies and emits the light in the light amplification unit 52.

The lower DBR 32 is a multilayer film reflector configured by alternately and repeatedly stacking two semiconductor layers having a thickness of $0.25\lambda/n$ each and different refractive indexes in a case where an oscillation wavelength of the semiconductor multilayer structure 20 is $\lambda$ and a refractive index of a medium (semiconductor layer) is n. As a specific example, the lower DBR 32 is configured by alternately and repeatedly stacking an n-type low refractive index layer made of $Al_{0.9}Ga_{0.1}As$ and an n-type high refractive index layer made of $Al_{0.2}Ga_{0.8}As$.

The active region 34 according to the present exemplary embodiment may be configured to include, for example, a lower spacer layer, a quantum well active region, and an upper spacer layer (not shown). The quantum well active region according to the present exemplary embodiment may be configured of, for example, barrier layers consisting of four layers of $Al_{0.3}Ga_{0.7}As$ and quantum well layers consisting of three layers of GaAs provided between the barrier layers. The lower spacer layer and the upper spacer layer are respectively disposed between the quantum well active region and the lower DBR 32 and between the quantum well active region and the upper DBR 36 to have a function of adjusting a length of the resonator and a function as a clad layer to confine a carrier.

The non-conductive region 60 and a conductive region 58, which are provided on the active region 34, are p-type oxidization constriction layers, that is, current constriction layers. That is, the non-conductive region 60 corresponds to an oxidized region, and the conductive region corresponds to a non-oxidized region. An interface between the conductive region 58 and the non-conductive region 60 forms an oxidation front 56.

In the present exemplary embodiment, one layer of the multilayer film constituting the lower DBR 32 is oxidized to form the non-conductive region 60 (oxidized region), and regions other than the non-conductive region 60 of this one layer are not oxidized to form the conductive region 58 (non-oxidized region). A current flowing from the first P electrode 41 and the second P electrode 42 toward the N electrode 40 is throttled by the conductive region 58.

In the present exemplary embodiment, the non-conductive region 60 (oxidized region) is formed in one layer of the lower DBR 32, but the present invention is not limited thereto. The non-conductive region 60 may be formed in a plurality of layers of the lower DBR 32 or on the upper DBR 36.

The upper DBR 36 is configured to include a p-DBR 66, a phase control layer 64, and an i-DBR 68. Although the p-DBR 66 is p-type, the i-DBR 68 does not contain an impurity. The phase control layer 64 is formed between the p-DBR 66 and the i-DBR 68, and is a layer that adjusts a relationship between the wavelength of the seed light Ls and a vertical resonance wavelength in the light amplification unit 52. In the present exemplary embodiment, the phase control layer 64 is formed by using, for example, a silicon oxide film ($SiO_2$), a silicon nitride film (SiON), or GaAs.

The insulating portion 54 is a layer that electrically insulates the light emitting unit 50 from the light amplification unit 52 and is formed by ion implantation as an example in the present exemplary embodiment.

The first P electrode 41 is a P electrode of the light emitting unit 50, and the second P electrode 42 is a P electrode of the light amplification unit 52.

In a case where the semiconductor multilayer structure 20 is driven, a positive electrode of a driving power source is applied to the first P electrode 41 and the second P electrode 42 and a negative electrode thereof is applied to the N electrode 40 to cause a drive current to flow from the first P electrode 41 and the second P electrode 42 to the N electrode 40. However, the polarities of the base layer 30, the lower DBR 32, and the upper DBR 36 are not limited thereto. The polarities may be reversed, that is, the base layer 30 may be a p-type GaAs substrate, the lower DBR 32 may be a p-type, and the upper DBR 36 may be an n-type.

The semiconductor multilayer structure 20 according to the present exemplary embodiment will be described in more detail. As shown in FIG. 3, in a case where the current is injected into the active region 34 by the first P electrode 41 and the N electrode 40 provided on both sides of the DBR in the light emitting unit 50, the seed light Ls is generated. The seed light Ls generated in the light emitting unit 50 propagates in a propagation direction from a left side of paper to a right side. In this case, the propagation light propagates mostly in the lower DBR 32, the active region 34, the conductive region 58, and the upper DBR 36 with a predetermined distribution. Therefore, the "DBR waveguide" is configured to include these parts.

The semiconductor multilayer structure 20 using the DBR waveguide is configured of a pair of DBRs provided on the base layer 30, which is a semiconductor substrate, an active region between the pair of DBRs, and a resonator spacer layer. The region sandwiched between the DBRs functions as an optical waveguide, and the light input into the DBR waveguide propagates in a slow light mode while being multiple-reflected in an oblique direction.

In this case, in a case where the current is injected into the active region 34 by the second P electrodes 42 and the N electrodes 40 provided on both sides of the DBR in the light amplification unit 52, light having a wavelength shorter than the vertical resonance wavelength is amplified. The amplified beam is output in a direction that intersects the surface of the base layer 30 and is inclined forward in the propagation direction of the DBR waveguide of the propagation light (obliquely forward direction). In FIG. 3, this output light is indicated as "output light Lf". That is, the region of the light amplification unit 52 provided with the second P electrode 42 and the N electrode 40 has both functions as the optical waveguide and the light amplification unit. A light emission region on a surface of the light amplification unit 52 functions as a light emission unit 52a in the present exemplary embodiment.

Figure 4:
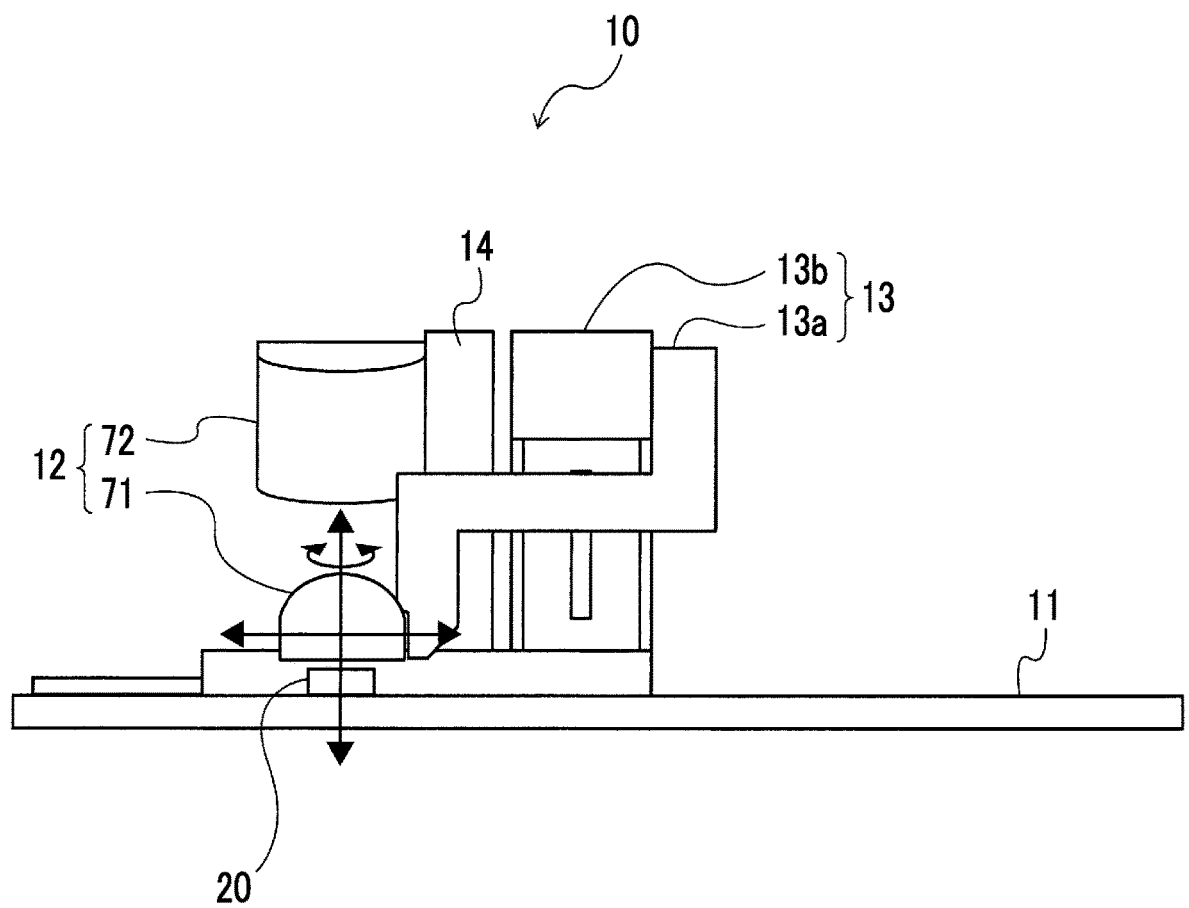
FIG. 4 is a front view of the semiconductor light emitter according to the first exemplary embodiment.

FIG. 4 is a front view of the semiconductor light emitter 10. As shown in FIG. 4, the shaping optical system 12 includes, as an example, a cylindrical lens 71 having positive power in the lateral direction SD and a positive lens 72 that collects the light emitted from the cylindrical lens 71. The cylindrical lens 71 is disposed at a position closest to the light amplification unit 52 in the shaping optical system 12.

The cylindrical lens 71 is held by a mechanical arm 13 fixed to the substrate 11. The mechanical arm 13 includes an arm portion 13a that holds the cylindrical lens 71 and a support column 13b that is fixed to the substrate 11 and holds the arm portion 13a. The arm portion 13a is configured to be movable in a left-right direction and a up-down direction with respect to the support column 13b in a case where the semiconductor light emitter 10 is viewed from a front (state shown in FIG. 4). The cylindrical lens 71 is configured to be rotatable in a horizontal plane with respect to the arm portion 13a. The positive lens 72 is held by a support column 14 fixed to the substrate 11.

Figure 5:
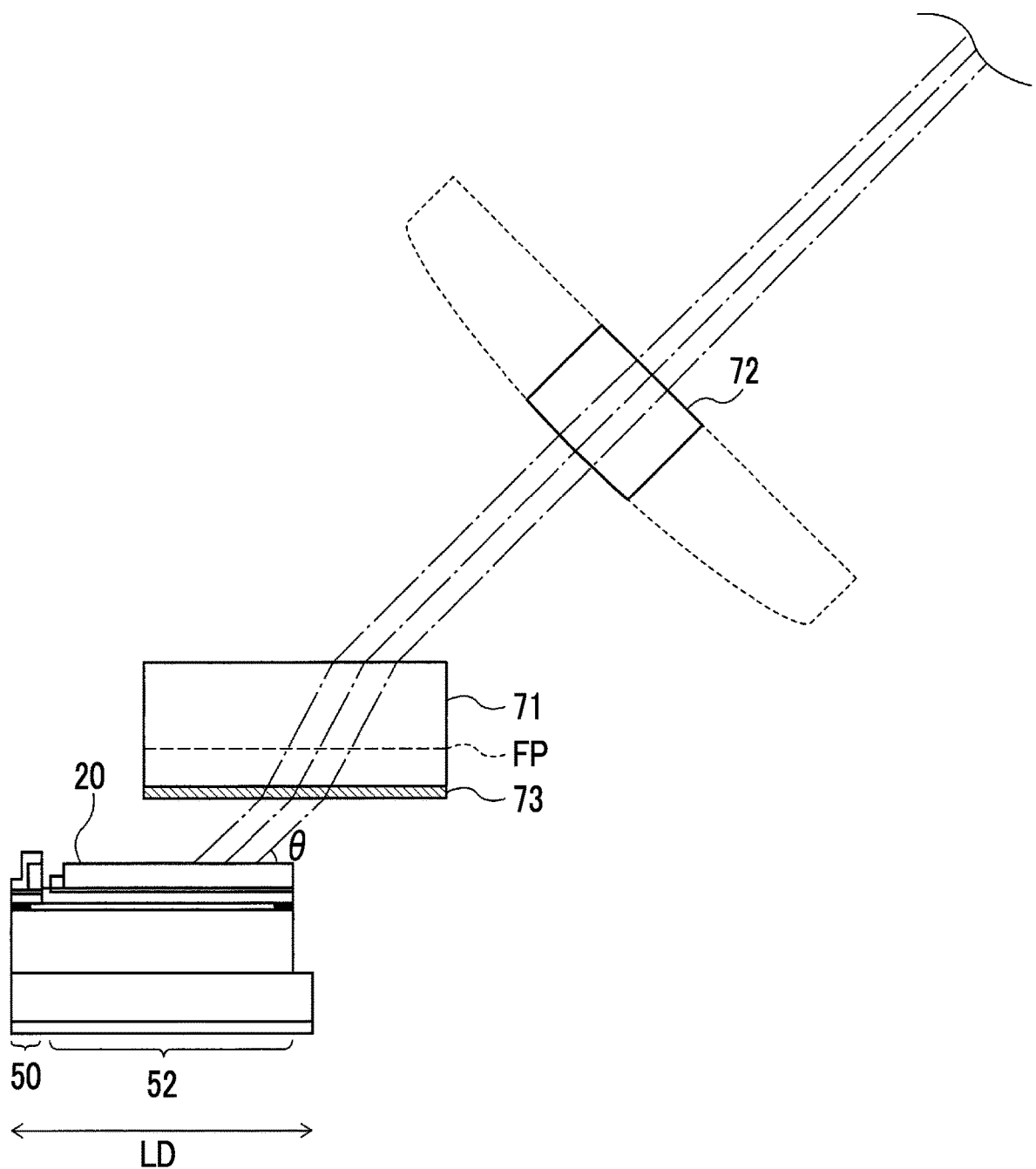
FIG. 5 is a side view of a positional relationship between the semiconductor multilayer structure and a shaping optical system according to the first exemplary embodiment.
Figure 6:
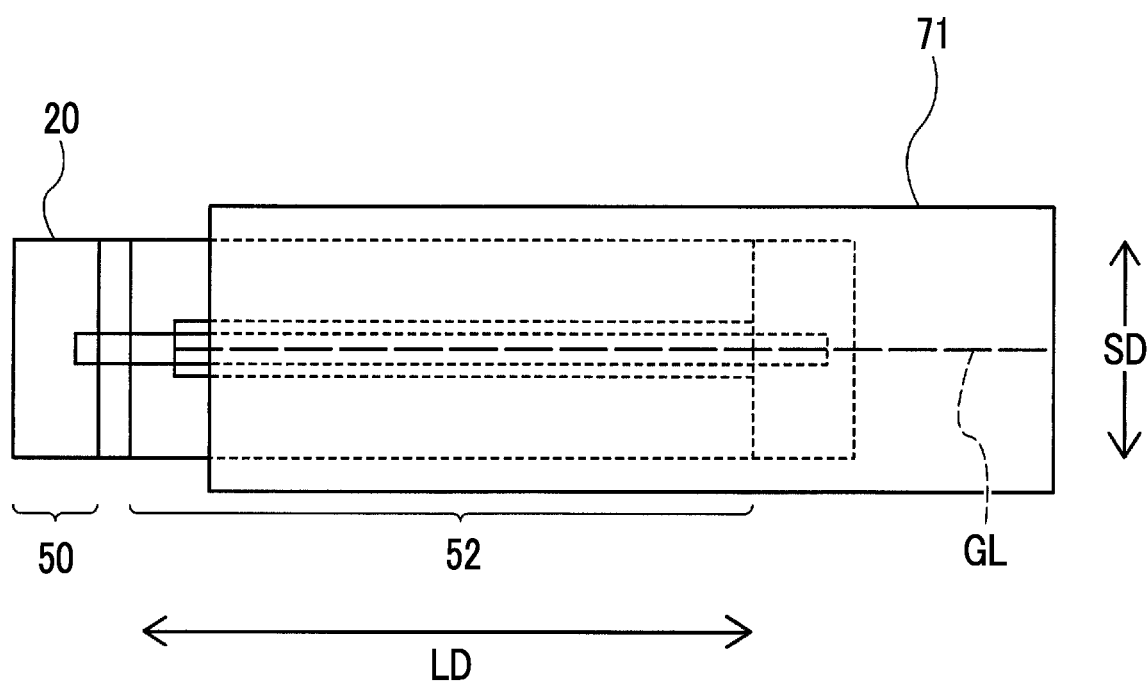
FIG. 6 is a top view of a positional relationship between the semiconductor multilayer structure and the shaping optical system according to the first exemplary embodiment.

FIG. 5 is a side view of a positional relationship between the semiconductor multilayer structure 20 and the shaping optical system 12. FIG. 6 is a top view of the positional relationship between the semiconductor multilayer structure 20 and the shaping optical system 12.

As shown in FIGS. 5 and 6, a front major plane FP of the cylindrical lens 71 is parallel to the light amplification unit 52, and a direction of a generatrix GL of the cylindrical lens 71 is parallel to the longitudinal direction LD.

An end portion on one side of the cylindrical lens 71 in the longitudinal direction LD is offset with respect to an end portion on one side of the light emission unit 52a in the longitudinal direction. The light emitted from the semiconductor multilayer structure 20 is emitted in an oblique direction of an emission angle θ with respect to a light emission surface of the semiconductor multilayer structure 20. A direction of offsetting the cylindrical lens 71 may be a front side in the light emission direction in the longitudinal direction LD or a rear side in the light emission direction in the longitudinal direction LD. With the offset of the cylindrical lens 71 with respect to the light emission unit 52a in this manner, a light transmission region can be limited, and thus stray light into the shaping optical system 12 can be suppressed.

An example will be described in which the direction of offsetting the cylindrical lens 71 with respect to the light emission unit 52a is set to the front side in the light emission direction in the longitudinal direction LD, as in the present exemplary embodiment.

In a case where the emission angle θ is smaller than 90° and the light is emitted obliquely upward to the right in FIG. 5, the cylindrical lens 71 is offset to the right. On the other hand, in a case where the emission angle θ is larger than 90° and the light is emitted obliquely upward to the left in FIG. 5, the cylindrical lens 71 may be offset to the left. With the offset of the cylindrical lens 71 in the light emission direction in this manner, most of main-diffraction light in the luminous flux emitted from the semiconductor multilayer structure 20 can be incident on the cylindrical lens 71. Light other than most of the main-diffraction light in the luminous flux emitted from the semiconductor multilayer structure 20 is difficult to be incident on the cylindrical lens 71. Therefore, the stray light into the shaping optical system 12 can be suppressed.

At least one lens in the shaping optical system 12 has a size that allows only the main-diffraction light in the luminous flux emitted from the semiconductor multilayer structure 20 to transmit. In the present exemplary embodiment, the positive lens 72 is cut into a rectangular shape about an optical axis to have a size that allows only the main-diffraction light in the luminous flux emitted from the semiconductor multilayer structure 20 to transmit, as an example. With the limit of the light transmission region in this manner, the stray light into the shaping optical system 12 can be suppressed.

The shaping optical system 12 includes a wavelength filter 73 that transmits the light having a wavelength of the main-diffraction light among the light emitted from the light amplification unit 52 and shields the light having a wavelength of sub-diffraction light. The wavelength filter 73 may be inserted in any place in the shaping optical system 12 as a parallel flat plate-shaped filter or may be coated on any lens surface in the shaping optical system 12. In the present exemplary embodiment, an example in which the wavelength filter 73 is coated on a light incident surface of the cylindrical lens 71 is shown, as an example. With the shield of the light having the wavelength of the sub-diffraction light in this manner, the stray light into the shaping optical system 12 can be suppressed.

The positional relationship between the semiconductor multilayer structure 20 and the cylindrical lens 71 in the shaping optical system 12 will be described in detail.

The light emitted from the light emission unit of the semiconductor multilayer structure 20 has characteristics of a plane wave in the longitudinal direction LD and characteristics of a spherical wave in the lateral direction SD. Therefore, the luminous flux emitted from the light emission unit of the semiconductor multilayer structure 20 becomes substantially parallel light in the longitudinal direction LD, whereas the luminous flux becomes diffused light in the lateral direction SD as compared with the light from the longitudinal direction LD. Therefore, in order to effectively use the luminous flux emitted from the semiconductor multilayer structure 20, the luminous flux emitted from the semiconductor multilayer structure 20 is once shaped into the parallel light by the cylindrical lens 71.

Figure 7A:
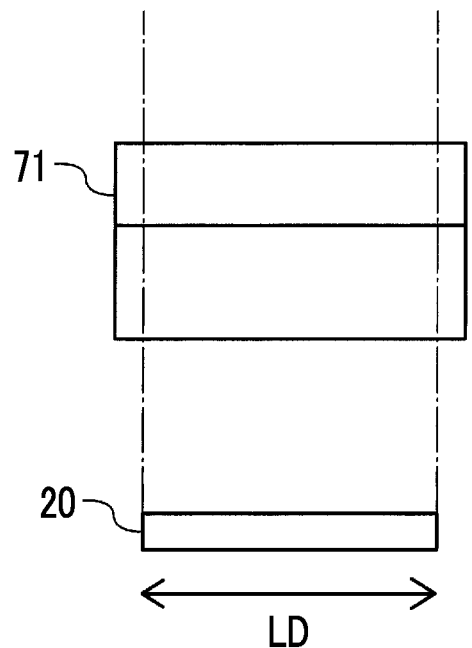
FIGS. 7A and 7B are diagrams showing a positional relationship between the semiconductor multilayer structure and a cylindrical lens in a case where light is emitted perpendicularly from the semiconductor multilayer structure.
Figure 7B:
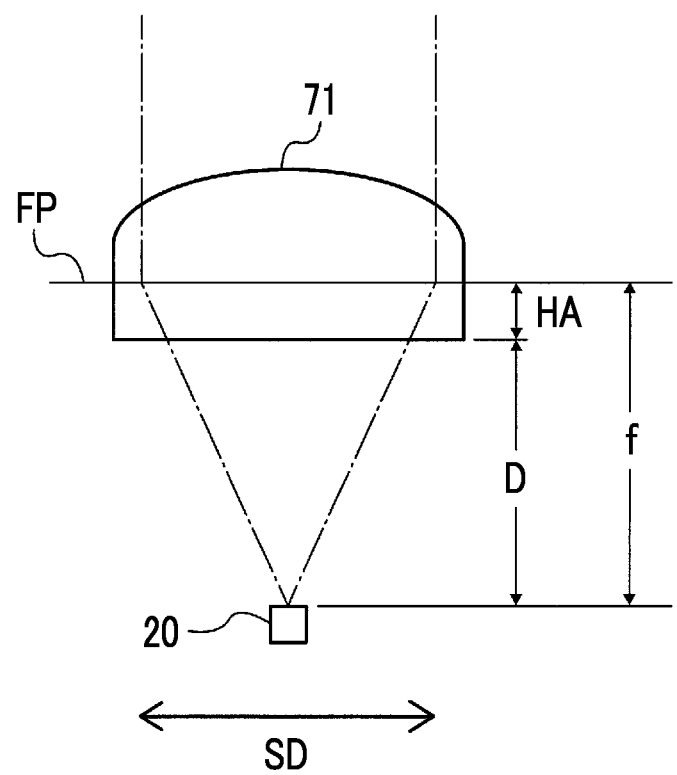
Figure 8A:
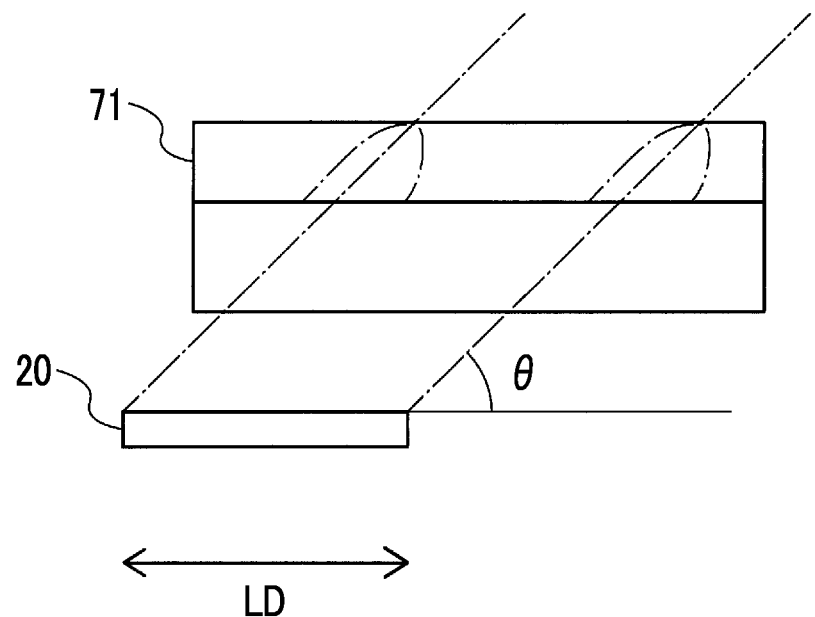
FIGS. 8A and 8B are diagrams showing an actual positional relationship between the semiconductor multilayer structure and the cylindrical lens.
Figure 8B:
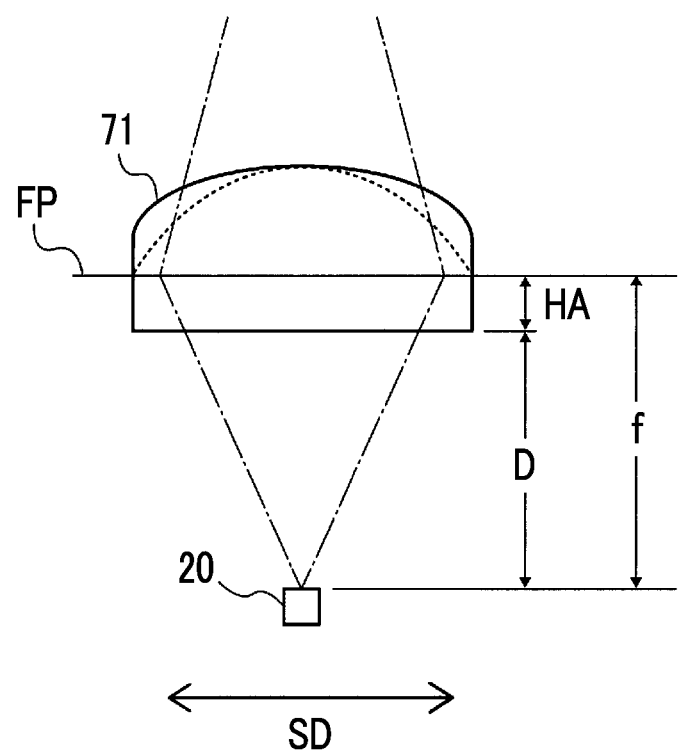

FIGS. 7A and 7B are diagrams showing the positional relationship between the semiconductor multilayer structure 20 and the cylindrical lens 71 in a case where the light is emitted perpendicularly from the semiconductor multilayer structure 20. FIG. 7A is a diagram showing a state of both in the longitudinal direction LD, and FIG. 7B is a diagram showing the state of both in the lateral direction SD. FIGS. 8A and 8B are diagrams showing an actual positional relationship between the semiconductor multilayer structure 20 and the cylindrical lens 71. FIG. 8A is a diagram showing a state of both in the longitudinal direction LD, and FIG. 8B is a diagram showing the state of both in the lateral direction SD.

As shown in FIGS. 7A and 7B, in a case where a distance from the light emission unit of the semiconductor multilayer structure 20 to the light incident surface of the cylindrical lens 71 is D, a distance from the light incident surface of the cylindrical lens 71 to the front major plane FP is HA, and a focal length of the cylindrical lens 71 is f, the distance D from the light emission unit of the semiconductor multilayer structure 20 to the light incident surface of the cylindrical lens 71 is, in a case where the light is emitted perpendicularly from the semiconductor multilayer structure 20, as shown in the following equation.

$$D<f-HA$$

However, as shown in FIGS. 8A and 8B, since the light is actually emitted from the semiconductor multilayer structure 20 in the oblique direction of the emission angle θ with respect to the substrate 11, a radius of curvature of a convex surface of the cylindrical lens 71 becomes substantially small. Therefore, the positive power of the cylindrical lens 71 in the lateral direction SD becomes stronger as compared with the case where light is perpendicularly incident on the cylindrical lens 71 as shown in FIGS. 7A and 7B.

Therefore, in a case where the distance D from the light emission unit of the semiconductor multilayer structure 20 to the light incident surface of the cylindrical lens 71 is f−HA, the luminous flux emitted from the semiconductor multilayer structure 20 cannot be actually shaped into the parallel light.

In order to address such a problem, the semiconductor light emitter 10 according to the present exemplary embodiment is configured to satisfy the following conditional equation (1) for the distance D from the light emission unit of the semiconductor multilayer structure 20 to the light incident surface of the cylindrical lens 71, $$D<f-HA \qquad (1).$$

That is, considering that the positive power of the cylindrical lens 71 is substantially increased in a case where the light is obliquely incident on the cylindrical lens 71, the distance D from the light emission unit of the semiconductor multilayer structure 20 to the light incident surface of the cylindrical lens 71 is made smaller than f−HA. With this, the luminous flux emitted from the semiconductor multilayer structure 20 is brought closer to the parallel light by the cylindrical lens 71 even in a case where the light is incident on the cylindrical lens 71.

In a case where each unit of the distance D from the light emission unit of the semiconductor multilayer structure 20 to the light incident surface of the cylindrical lens 71, the distance HA from the light incident surface of the cylindrical lens 71 to the front major plane FP, and the focal length f of the cylindrical lens 71 is mm, the configuration may be employed such that the following conditional equation (1A) is satisfied. With the configuration of the semiconductor light emitter 10 so as not to be equal to or less than a lower limit of the conditional equation (1A), a space between the semiconductor multilayer structure 20 and the cylindrical lens 71 can be set to 0.3 mm or more. Therefore, a manufacture of the semiconductor multilayer structure 20, particularly bonding of the semiconductor multilayer structure 20 to the substrate 11 becomes easy, $$0.3 \text{ mm}<D<f-HA \qquad (1A).$$

Figure 9A:
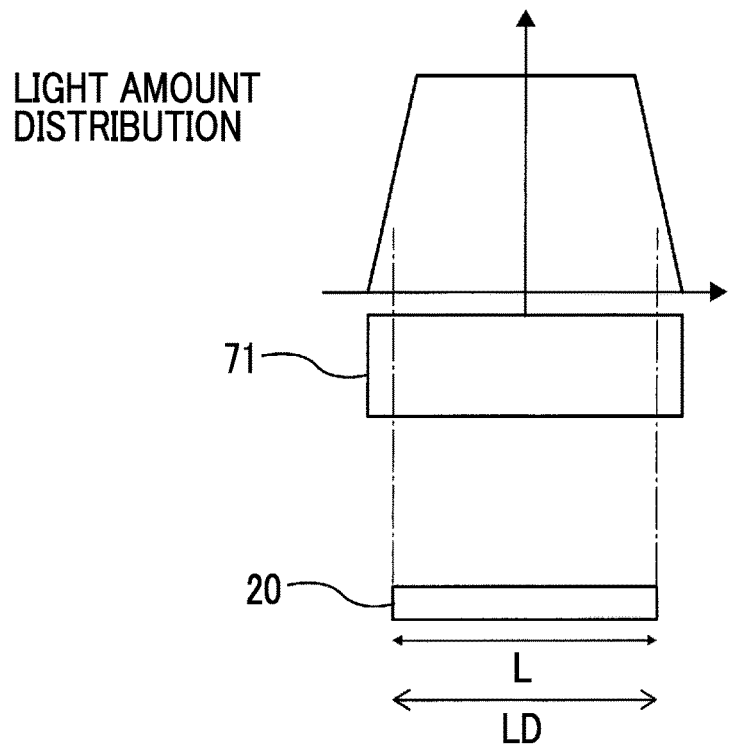
FIGS. 9A and 9B are diagrams showing a light amount distribution of the light emitted from the semiconductor multilayer structure.
Figure 9B:
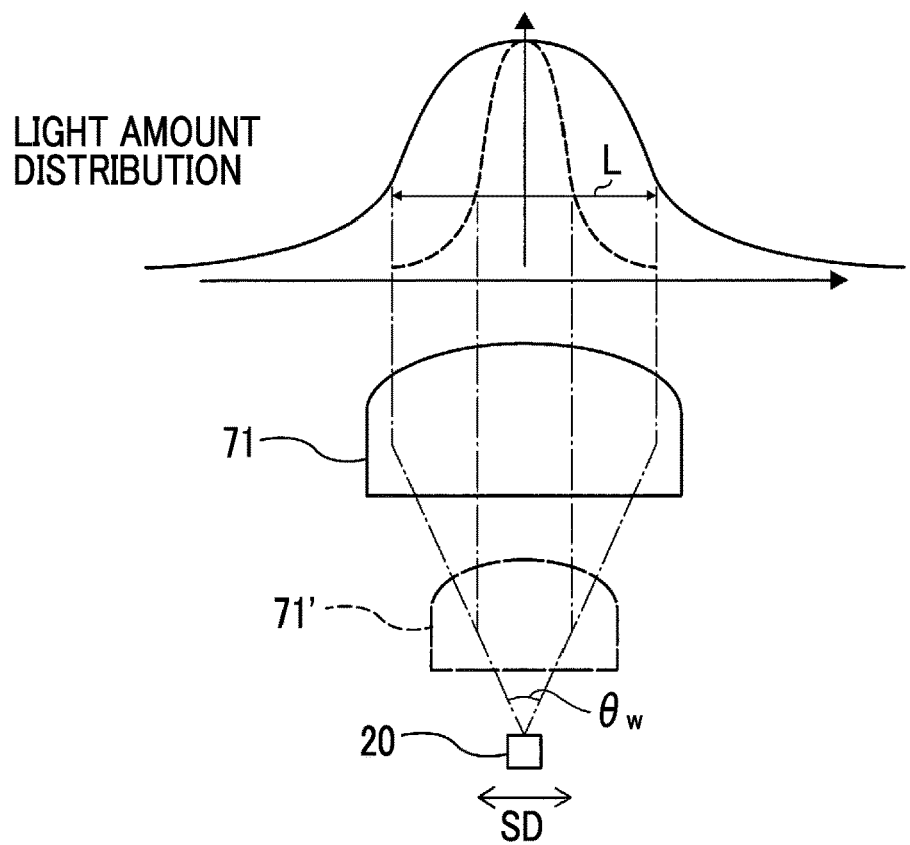

FIGS. 9A and 9B are diagrams showing a light amount distribution of the light emitted from the semiconductor multilayer structure 20. FIG. 9A is a diagram showing a state of both in the longitudinal direction LD, and FIG. 9B is a diagram showing the state of both in the lateral direction SD. In the figure showing the state of both in the longitudinal direction LD in FIG. 9A, for convenience, the light is emitted perpendicularly from the semiconductor multilayer structure 20. However, the light is actually emitted obliquely from the semiconductor multilayer structure 20. However, since the light emitted from the semiconductor multilayer structure 20 has characteristics similar to the parallel light in the longitudinal direction LD, there is no big difference in a graph shape of the light amount distribution.

As shown in FIG. 9B, in a case where the focal length of the cylindrical lens 71 is f, a length of the light emission unit in the longitudinal direction LD is L, and a total angle at half maximum of the luminous flux emitted from the light emission unit in the lateral direction SD is θw, the semiconductor light emitter 10 according to the present exemplary embodiment is configured to satisfy the following conditional equation (2), $$f < L/(2 \times \tan(\theta w/2)) \tag{2}$$

An effective luminous flux width (half width at half maximum) of the light emitted from the semiconductor multilayer structure 20 in the lateral direction SD is expressed by 2f×tan (θw/2). In this case, for a conditional equation in a case where the effective luminous flux width (half width at half maximum) of the light emitted from the semiconductor multilayer structure 20 in the lateral direction SD is made smaller than the length L of the light emission unit in the longitudinal direction LD, in a case where the focal length f of the cylindrical lens 71 is rewritten to a left side, the conditional equation (2) is obtained. With the configuration satisfying the conditional equation (2), transmittance of the light emitted from the semiconductor multilayer structure in the cylindrical lens can be improved as compared with a configuration not satisfying the conditional equation (2).

In the case where the focal length of the cylindrical lens 71 is f, the length of the light emission unit in the longitudinal direction LD is L, and the total angle at half maximum of the luminous flux emitted from the light emission unit in the lateral direction SD is θw, the semiconductor light emitter 10 according to the present exemplary embodiment is configured to satisfy the following conditional equation (3), $$0.4L < 2 \times f \times \tan(\theta w/2) < L \tag{3}$$

The effective luminous flux width (half width at half maximum: 2f×tan (θw/2)) of the light emitted from the semiconductor multilayer structure 20 in the lateral direction SD changes by moving the cylindrical lens 71 as shown by the cylindrical lens 71 and a cylindrical lens 71' in FIG. 9B, for example. The effective luminous flux width (half width at half maximum: 2f×tan (θw/2)) of the light emitted from the semiconductor multilayer structure 20 in the lateral direction SD to the length L of the light emission unit in the longitudinal direction LD is kept within a range of the conditional equation (3). With this, an aspect ratio of a luminous flux diameter of the light emitted from the semiconductor multilayer structure 20 after transmitting the cylindrical lens 71 can be made uniform as compared with a configuration not satisfy the conditional equation (3).

The conditional equation (2) may also be defined from another viewpoint.

Figure 10:
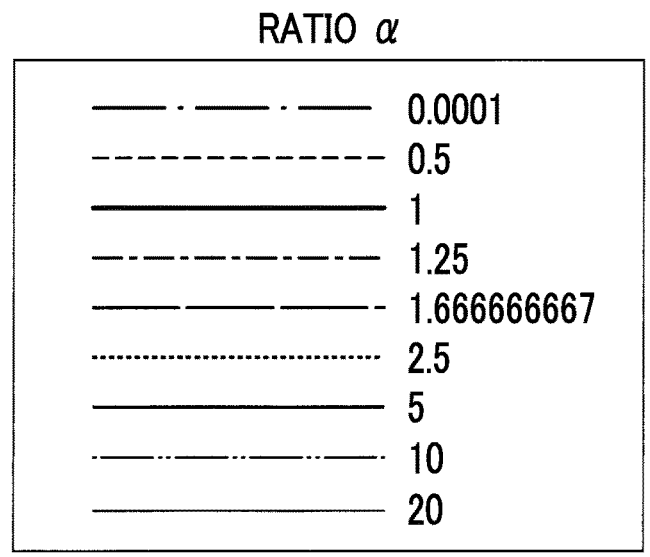
FIG. 10 is a graph showing light amount distributions when a focal length f is changed to change a ratio $\alpha$ to an element length L in a longitudinal direction LD.
Figure 10:
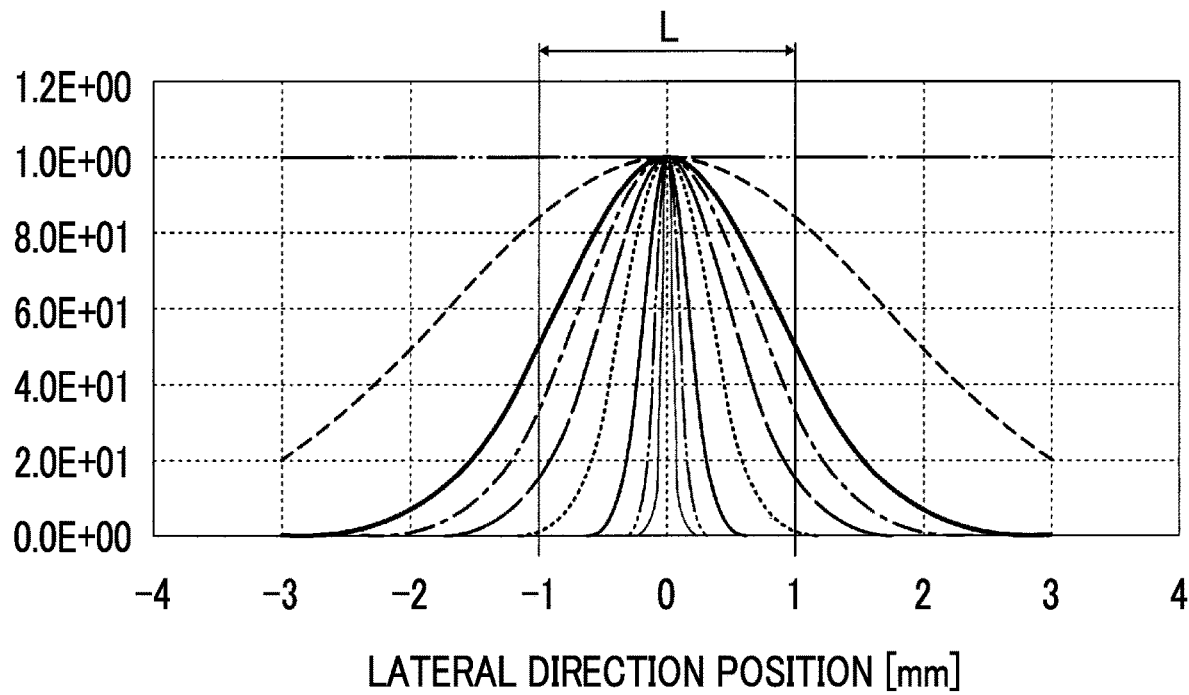

For the effective luminous flux width (half width at half maximum) of the light emitted from the semiconductor multilayer structure 20 in the lateral direction SD, light amount distributions when the focal length f is changed to change a ratio α to the element length L in the longitudinal direction LD with L=2 mm and θw=10° are as shown in a graph shown in FIG. 10.

Figure 11:
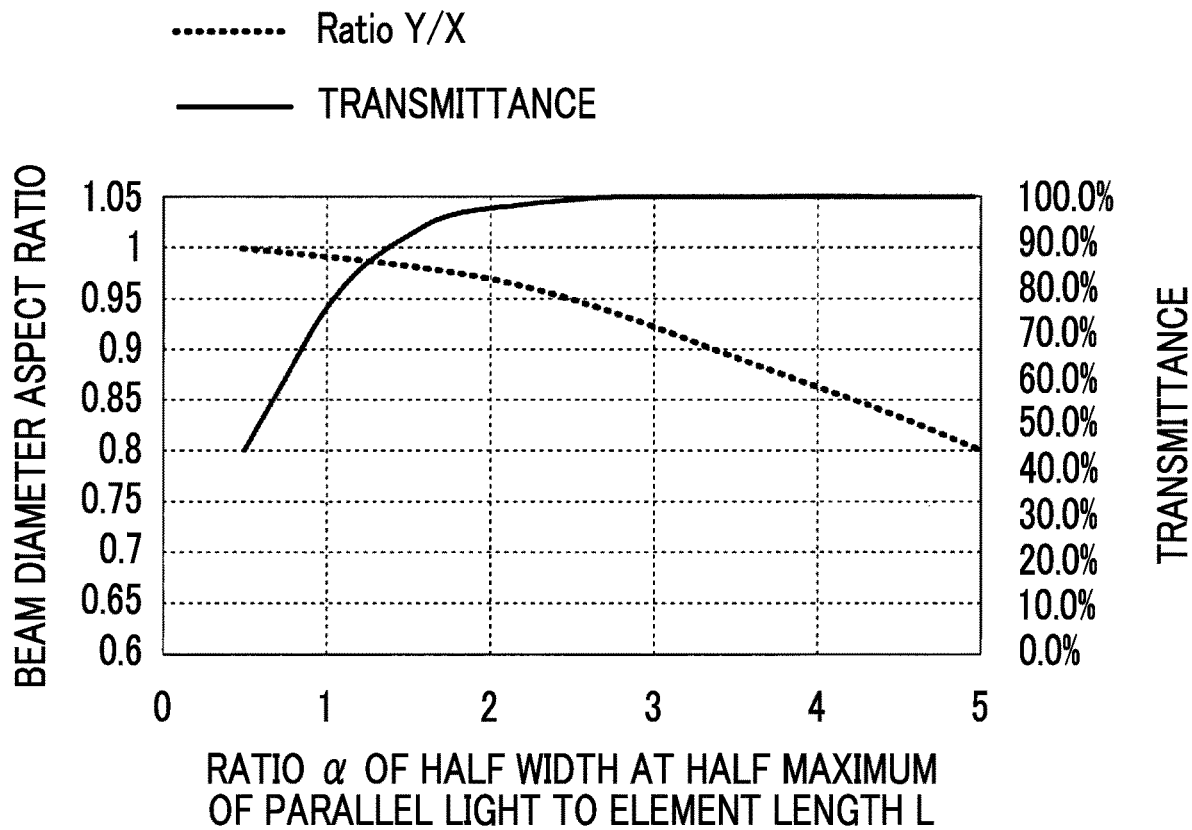
FIG. 11 is a graph showing a relationship between an aspect ratio of a beam diameter and transmittance in a case where an image is formed with a beam narrowed with a spherical lens having a focal length of 30 mm for the light amount distribution characteristic shown in FIG. 10.

A relationship between an aspect ratio of a beam diameter and transmittance in a case where an image is formed with a beam narrowed with a spherical lens having a focal length of 30 mm for these light amount distributions is as shown in a graph shown in FIG. 11. In a case where the aspect ratio is a value exceeding 0.95 and the transmittance is 75% or more from processing conditions, the ratio α of the effective luminous flux width (half width at half maximum) in the lateral direction SD to the element length L in the longitudinal direction LD becomes a form of the following conditional equation.

$$1 < \alpha < 2.5$$

In a case where this condition is applied to the conditional equation (2), a form of the following conditional equation (2A) is obtained, $$L/(2.5 \times 2 \times \tan(\theta w/2)) < f < L/(2 \times \tan(\theta w/2)) \tag{2A}$$

Figure 12:
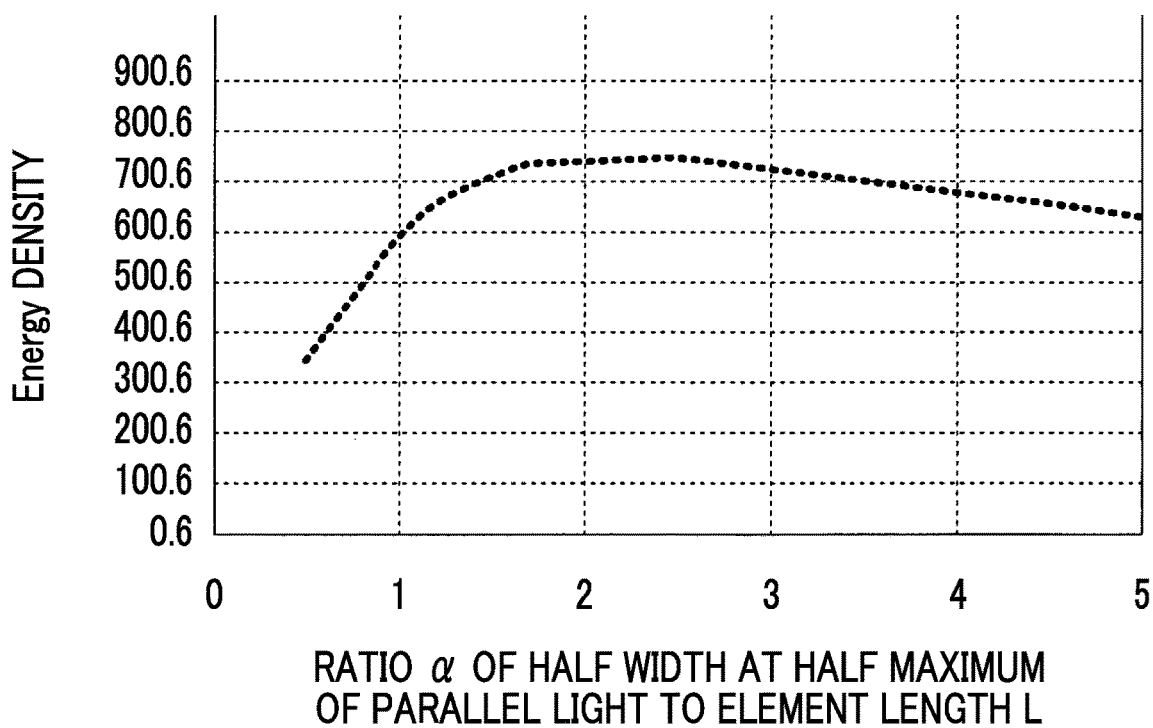
FIG. 12 is a graph showing the relationship between the ratio $\alpha$ of an effective luminous flux width (half width at half maximum) in the lateral direction to the element length in the longitudinal direction and energy density for the light amount distribution characteristic shown in FIG. 10.

A relationship between the ratio α of the effective luminous flux width (half width at half maximum) of the lateral direction SD to the element length L in the longitudinal direction LD and energy density is as shown in a graph shown in FIG. 12.

In order to maintain high energy density from processing conditions, the ratio α of the effective luminous flux width (half width at half maximum) of the lateral direction SD to the element length L in the longitudinal direction LD becomes a form of the following conditional equation.

$$\alpha < 2.5$$

In a case where this condition is applied to the conditional equation (2), a form of the following conditional equation (2B) is obtained, $$L/(2.5 \times 2 \times \tan(\theta w/2)) < f \tag{2B}$$

An ideal distance DS between the semiconductor multilayer structure 20 and the cylindrical lens 71 in a case where the light beam is emitted in a e direction can be shown as follows, in a case where a distance from the light incident surface of the cylindrical lens 71 to the front major plane FP in the e direction is HAs, a focal length of the cylindrical lens 71 in the e direction is fs, a thickness of the cylindrical lens 71 is t, a refractive index of the cylindrical lens 71 is n, and a radius of curvature of the light emission surface of the cylindrical lens 71 is r.

$$HAs = -t/(n \times \sin \theta)$$

$$fs = -r \times \cos \theta/(n-1)$$

$$Ds/\sin \theta = fs - HAs$$

$$Ds = -r \times \sin \theta \times \cos \theta/(n-1) - t/n = D + r/(n-1) \times (1 - \sin(2\theta/\theta))$$

Figure 13:
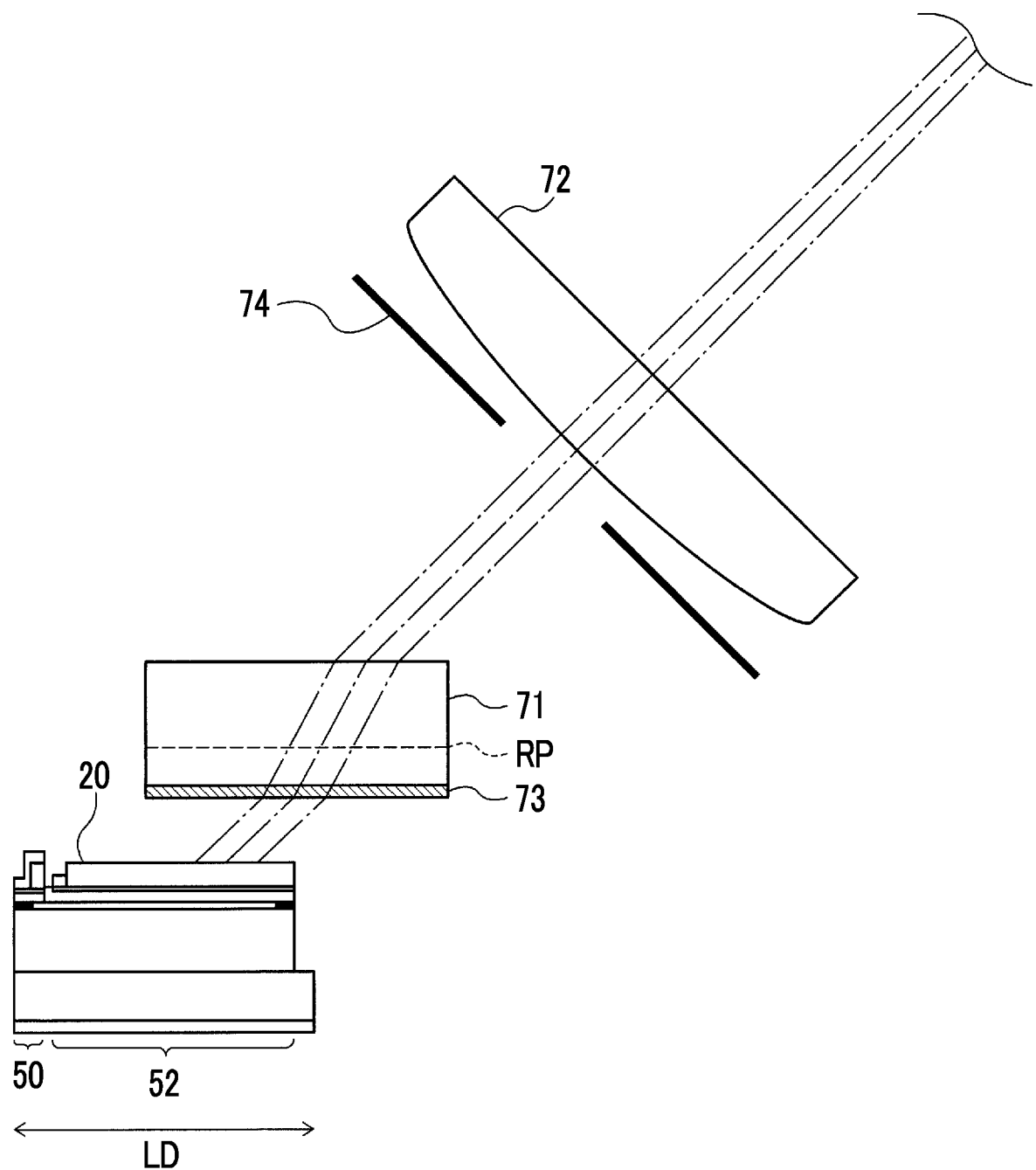
FIG. 13 is a side view of a modification example of the shaping optical system according to the first exemplary embodiment.

As a modification example of the semiconductor light emitter 10 according to the present exemplary embodiment, as shown in FIG. 13, the shaping optical system 12 may include the cylindrical lens 71, the positive lens 72 that forms an image of the luminous flux emitted from the cylindrical lens 71, and an aperture 74 between the cylindrical lens 71 and the positive lens 72. Even in such an aspect, only the main-diffraction light in the luminous flux emitted from the semiconductor multilayer structure 20 can be transmitted, and the stray light into the shaping optical system 12 can be suppressed.

In the present exemplary embodiment, the semiconductor multilayer structure 20 emits the light, which is propagated and amplified in the longitudinal direction by the light amplification unit 52, from the light emission unit 52a. However, the light emitted from the light emission unit 52a may not be the amplified light.

In the present exemplary embodiment, the semiconductor multilayer structure 20 amplifies the seed light Ls generated from the light emitting unit 50 by the light amplification unit 52. However, the semiconductor multilayer structure 20 may amplify light emitted by the semiconductor layer itself of the light amplification unit in a state where there is no seed light Ls and a current is directly applied to the light amplification unit.

Figure 14:
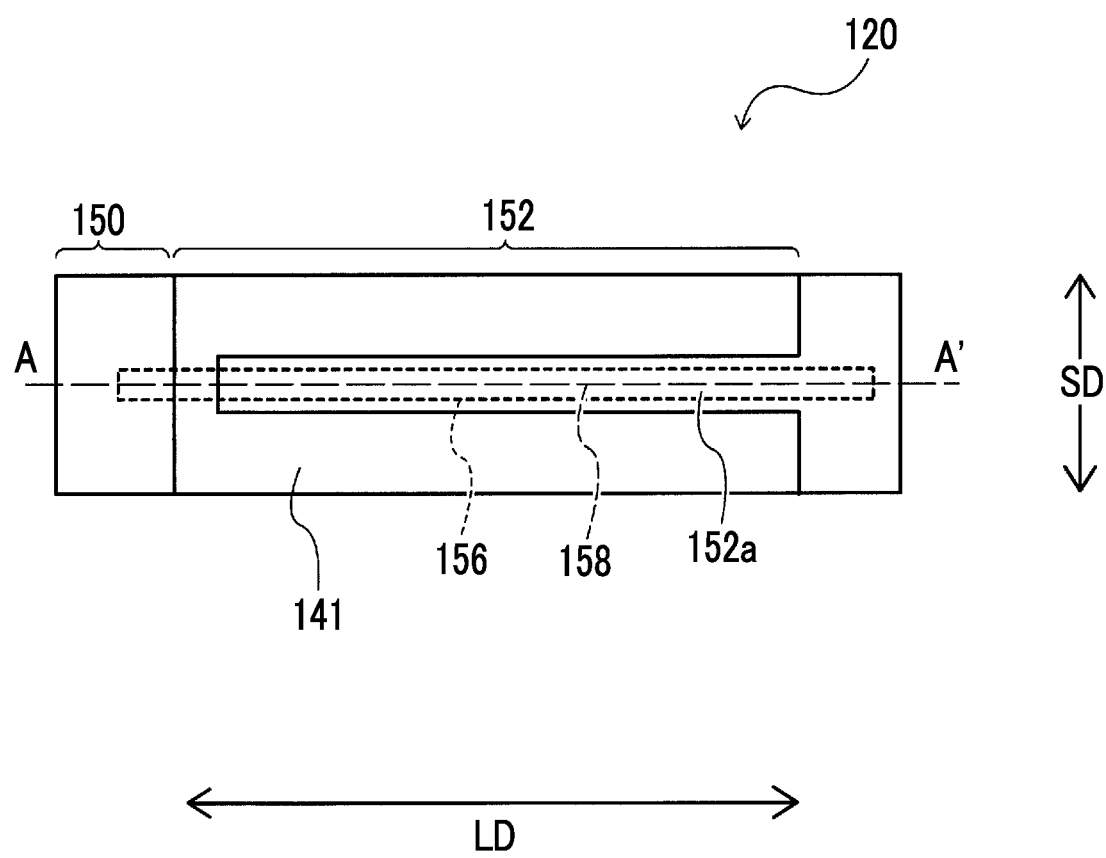
FIG. 14 is a plan view of another form of the semiconductor multilayer structure according to the first exemplary embodiment.
Figure 15:
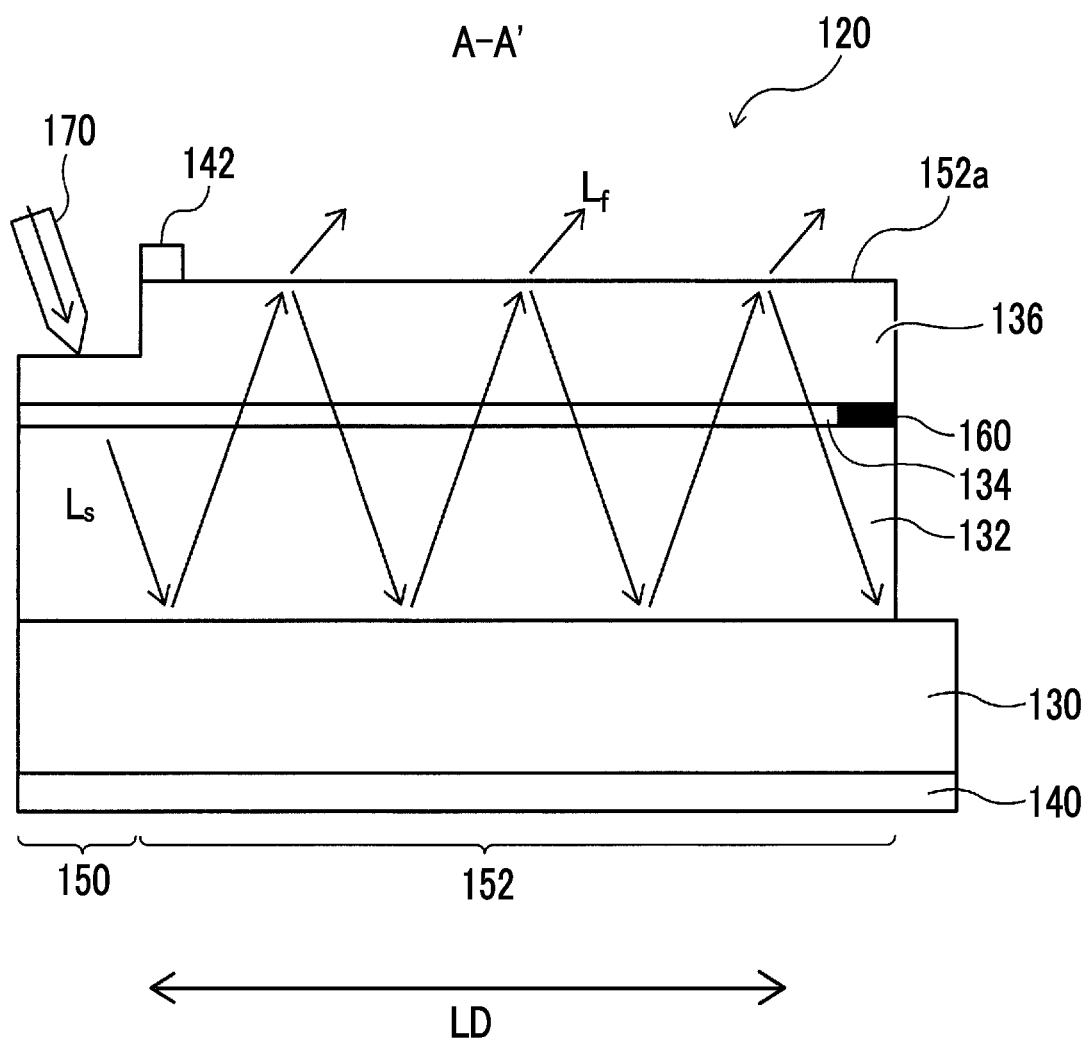
FIG. 15 is a cross-sectional view taken along a line A-A' shown in FIG. 14.

In the present exemplary embodiment, the semiconductor multilayer structure 20 may employ a configuration in which the seed light is introduced from the outside as in a semiconductor multilayer structure 120 shown in FIGS. 14 and 15, instead of the configuration in which the seed light generation unit is integrated on the identical chip as shown in FIG. 3.

FIG. 14 is a plan view of the semiconductor multilayer structure 120, and FIG. 15 is a cross-sectional view taken along a line A-A' shown in FIG. 14. The semiconductor multilayer structure 120 includes an optical coupling portion 150 and a light amplification unit 152 that is extended from the optical coupling portion 150 and amplifies the light propagating in an extended direction.

The optical coupling portion 150 propagates input light from an external light source (not shown) via an optical fiber 170 and couples an output end of the optical fiber 170 to the optical coupling portion 150 that functions as a light source unit of the semiconductor multilayer structure 120 to introduce the input light into the light amplification unit 52. For example, the vertical cavity surface emitting laser (VCSEL) is used as the external light source. A lensed fiber may be used as the optical fiber 170 from the viewpoint of light coupling efficiency.

The light amplification unit 152 has a function of amplifying and emitting the seed light Ls introduced in the optical coupling portion 150. A light emission region on a surface of the light amplification unit 152 functions as a light emission unit 152a.

The semiconductor multilayer structure 120 is configured to include a lower DBR 132, an active region 134, a non-conductive region 160, an upper DBR 136, and a P electrode 141, which are formed on a base layer 130, and an N electrode 140 formed on a back surface of the base layer 130. Unlike the semiconductor multilayer structure 20 shown in FIG. 3, the upper DBR 136 does not include the phase control layer and the i-DBR.

The non-conductive region 160 and a conductive region 158, which are provided on the active region 134, are p-type oxidization constriction layers, that is, current constriction layers. That is, the non-conductive region 160 corresponds to the oxidized region, and the conductive region 158 corresponds to the non-oxidized region. An interface between the conductive region 158 and the non-conductive region 160 forms an oxidation front 156.

The semiconductor multilayer structure 120 amplifies the light having a wavelength shorter than the vertical resonance wavelength in the same manner as the semiconductor multilayer structure 20. The wavelength and light output of the seed light are variable, which is beneficial for searching for an optimum structure of the amplifier, a seed light condition, and the like. The semiconductor multilayer structure 120 has a simpler structure than the semiconductor multilayer structure 20 and thus can be manufactured by the same process as a general VCSEL process.

Figure 16:
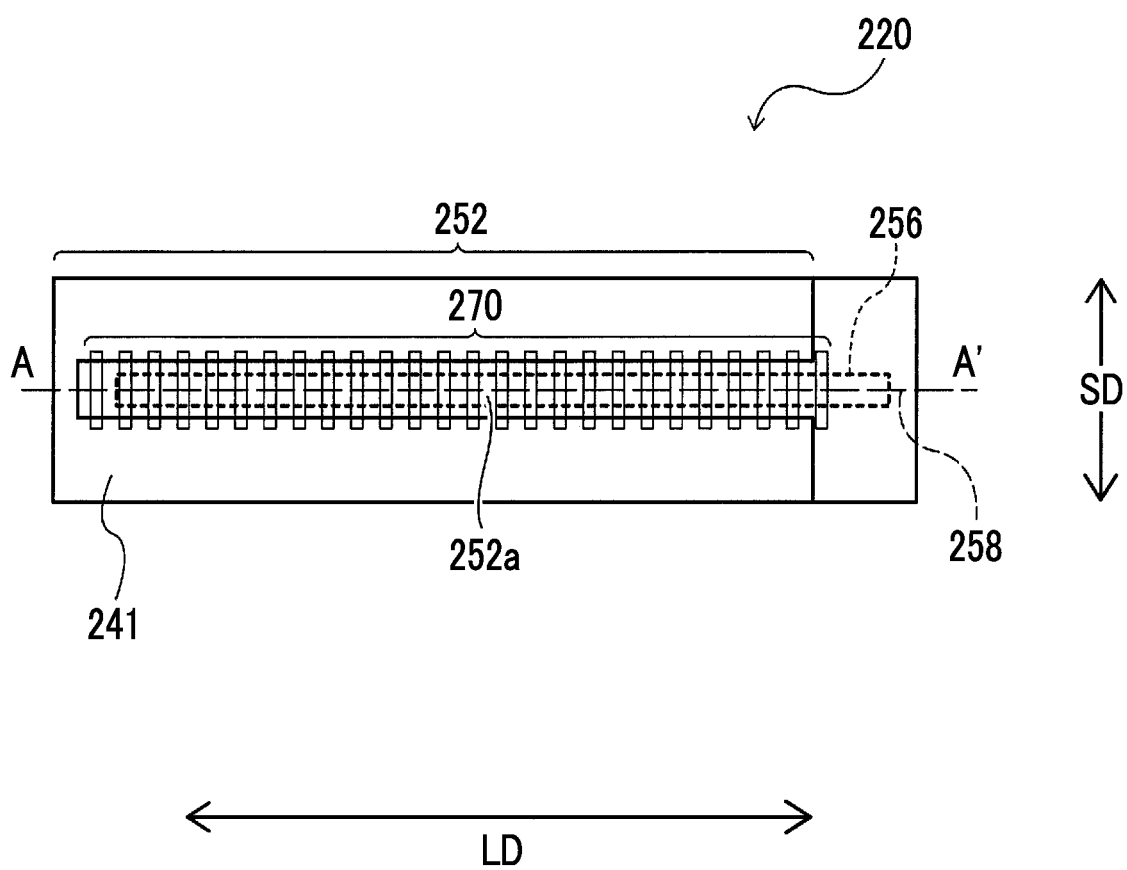
FIG. 16 is a plan view of still another form of the semiconductor multilayer structure according to the first exemplary embodiment.
Figure 17:
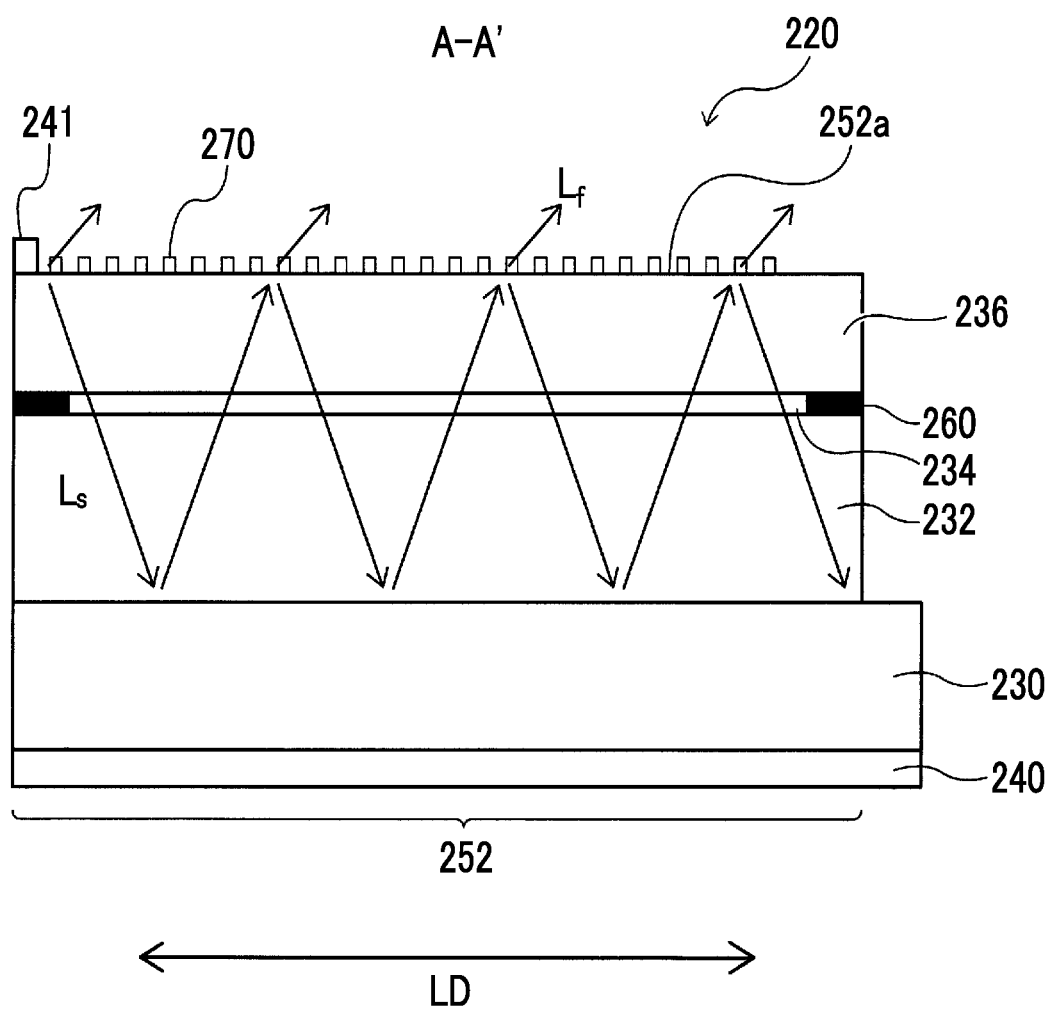
FIG. 17 is a cross-sectional view taken along a line A-A' shown in FIG. 16.
Figure 18:
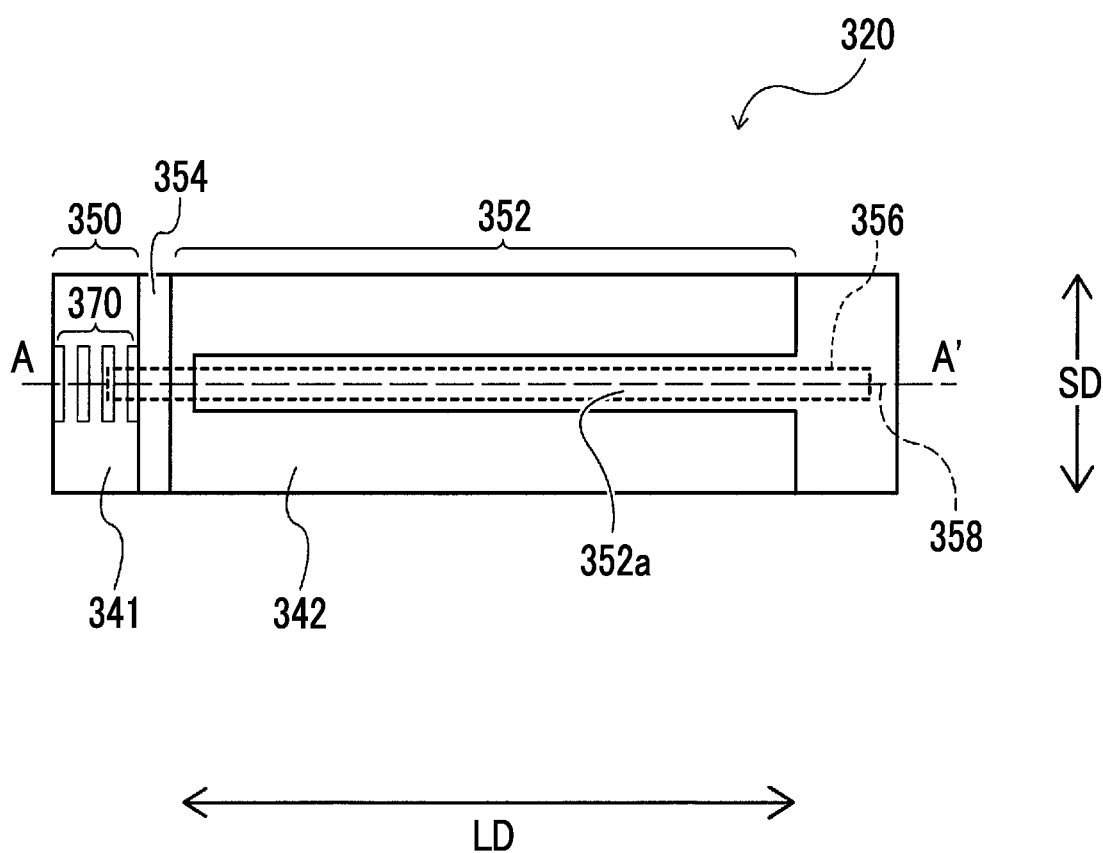
FIG. 18 is a plan view of still another form of the semiconductor multilayer structure according to the first exemplary embodiment.
Figure 19:
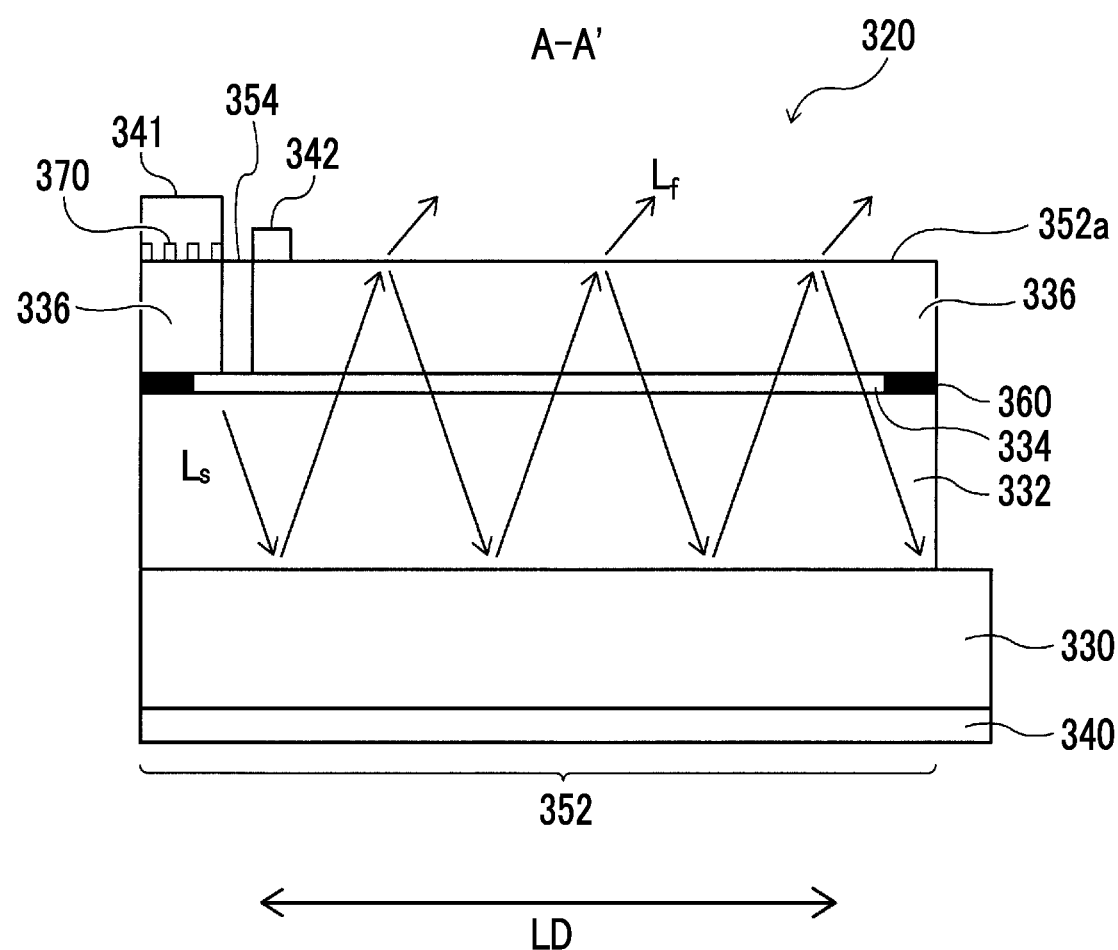
FIG. 19 is a cross-sectional view taken along a line A-A' shown in FIG. 18.

In the present exemplary embodiment, the semiconductor multilayer structure 20 may be employed for a configuration in which a diffraction grating is used as in a semiconductor multilayer structure 220 shown in FIGS. 16 and 17 or a semiconductor multilayer structure 320 shown in FIGS. 18 and 19.

FIG. 16 is a plan view of the semiconductor multilayer structure 220, and FIG. 17 is a cross-sectional view taken along a line A-A' shown in FIG. 16. The semiconductor multilayer structure 220 includes a light amplification unit 252 that amplifies the light propagating in an extended direction.

The light amplification unit 252 has a function of amplifying and emitting the seed light Ls generated internally in the same manner as the general VCSEL. A light emission region on a surface of the light amplification unit 252 functions as a light emission unit 252a.

The semiconductor multilayer structure 220 is configured to include a lower DBR 232, an active region 234, a non-conductive region 260, an upper DBR 236, a P electrode 241, and a diffraction grating 270, which are formed on a base layer 230, and an N electrode 240 formed on a back surface of the base layer 230.

The non-conductive region 260 and a conductive region 258, which are provided on the active region 234, are p-type oxidization constriction layers, that is, current constriction layers. That is, the non-conductive region 260 corresponds to the oxidized region, and the conductive region 258 corresponds to the non-oxidized region. An interface between the conductive region 258 and the non-conductive region 260 forms an oxidation front 256.

The semiconductor multilayer structure 220 amplifies the light having a wavelength shorter than the vertical resonance wavelength in the same manner as the semiconductor multilayer structure 20. In the semiconductor multilayer structure 220, light in a slow light mode determined by the configuration of the diffraction grating 270 formed in the light emission unit 252a is output. In the semiconductor multilayer structure 220, the seed light is not indispensable, and the light is emitted in the same manner as the general VCSEL, and the wavelength to be amplified is determined by the configuration of the diffraction grating 270.

FIG. 18 is a plan view of the semiconductor multilayer structure 320, and FIG. 19 is a cross-sectional view taken along a line A-A' shown in FIG. 18. The semiconductor multilayer structure 320 includes a light emitting unit 350 and a light amplification unit 352 that is extended from the light emitting unit 350 and amplifies the light propagating in an extended direction.

The light emitting unit 350 is a portion that generates the seed light Ls and is configured as the VCSEL provided with a diffraction grating 370. As shown in FIG. 19, the seed light Ls generated from the light emitting unit 350 propagates toward the light amplification unit 352.

The light amplification unit 352 has a function of amplifying and emitting the seed light Ls, which is the light generated by the light emitting unit 350. A light emission region on a surface of the light amplification unit 352 functions as a light emission unit 352a.

The semiconductor multilayer structure 320 is configured to include a lower DBR 332, an active region 334, a non-conductive region 360, an upper DBR 336, a first P electrode 341, a second P electrode 342, an ion implantation unit 354, and a diffraction grating 370, which are formed on a base layer 330, and an N electrode 340 formed on a back surface of the base layer 330.

The non-conductive region 360 and a conductive region 358, which are provided on the active region 334, are p-type oxidization constriction layers, that is, current constriction layers. That is, the non-conductive region 360 corresponds to the oxidized region, and the conductive region 358 corresponds to the non-oxidized region. An interface between the conductive region 358 and the non-conductive region 360 forms an oxidation front 356.

The semiconductor multilayer structure 320 amplifies the light having a wavelength shorter than the vertical resonance wavelength in the same manner as the semiconductor multilayer structure 20. In the semiconductor multilayer structure 320, light having a wavelength determined by the configuration of the diffraction grating 370 formed in the light emitting unit 350 is output.

In a case where the cylindrical lens 71 is offset such that the cylindrical lens 71 does not overlap the seed light portion, the optical coupling portion, or the end portion where the P electrode is formed in the semiconductor multilayer structure, wiring to the electrode or introduction of the light to the optical coupling portion can be easily performed even in a case where the cylindrical lens 71 and the light emission surface are brought close to each other.

Second Exemplary Embodiment

Figure 20:
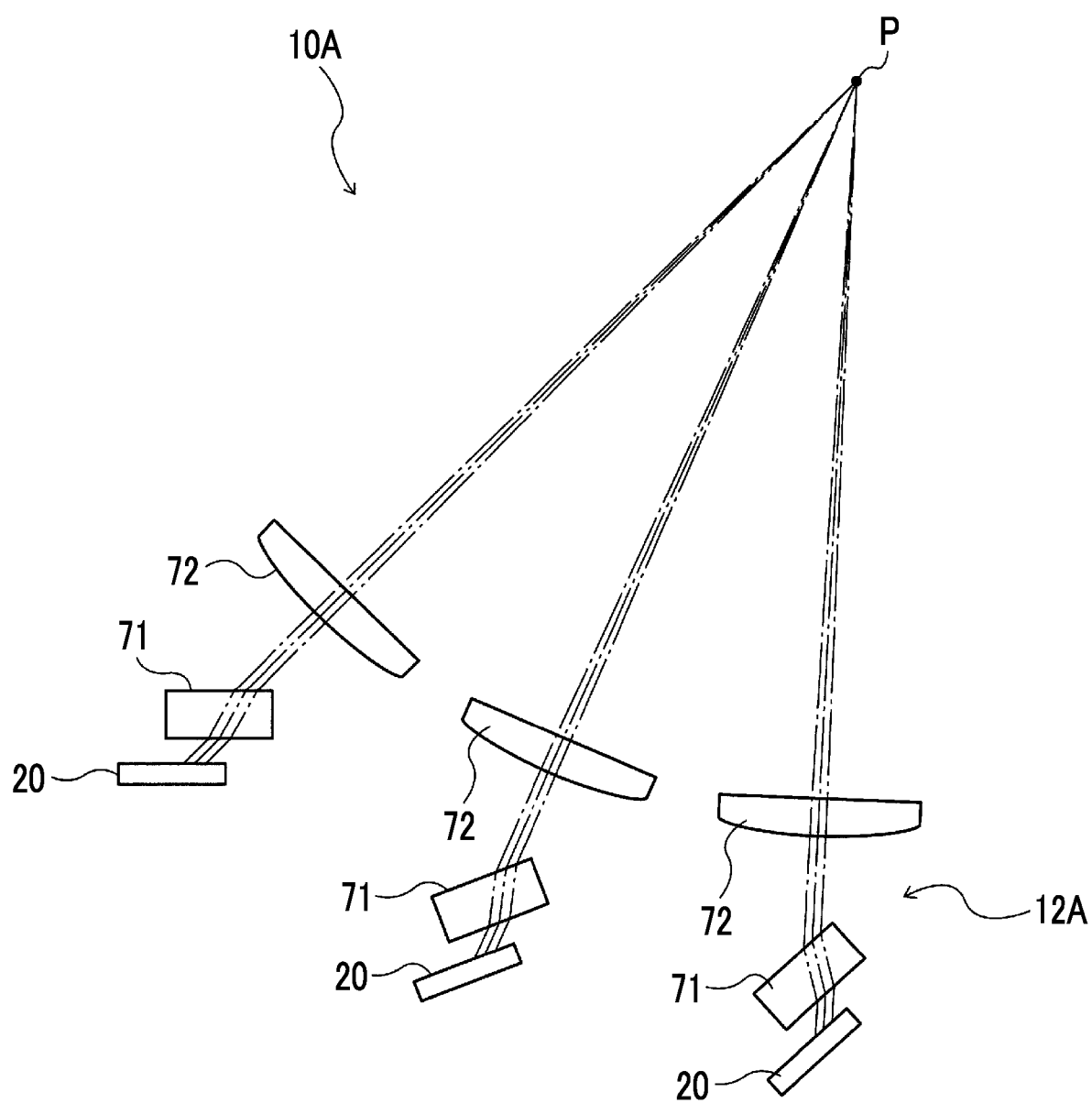
FIG. 20 is a schematic configuration diagram showing a semiconductor multilayer structure and a shaping optical system of a semiconductor light emitter according to a second exemplary embodiment.

Next, a semiconductor light emitter 10A according to the present exemplary embodiment will be described with reference to FIG. 20. FIG. 20 is a schematic configuration diagram showing a semiconductor multilayer structure 20 and a shaping optical system 12A of the semiconductor light emitter 10A. The same reference numbers are assigned to the same components as components of the semiconductor light emitter 10 according to the first exemplary embodiment, and the description of the same components will be omitted.

As shown in FIG. 20, the semiconductor light emitter 10A includes a plurality of semiconductor multilayer structures 20. The shaping optical system 12A includes a plurality of cylindrical lenses 71 and a plurality of positive lenses 72 that form images of luminous fluxes emitted from the cylindrical lens 71, which are corresponding to each of the plurality of semiconductor multilayer structures 20. The plurality of semiconductor multilayer structures 20 are disposed such that image formation positions P of the luminous flux emitted from the semiconductor multilayer structure 20 match.

With such a configuration, the light output of the plurality of semiconductor multilayer structures 20 can be focused on one point. Therefore, the light output can be improved as compared with the case where only one semiconductor multilayer structure 20 is provided.

Third Exemplary Embodiment

Figure 21:
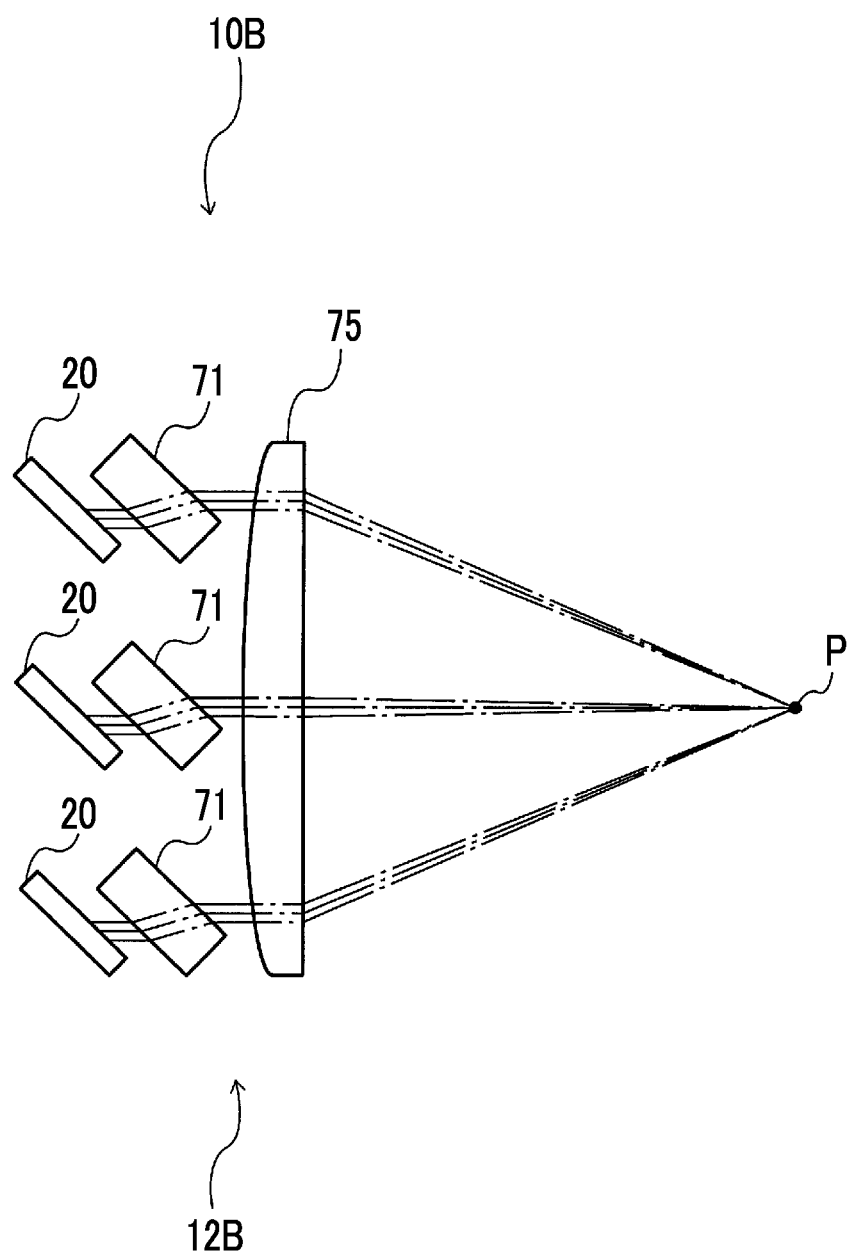
FIG. 21 is a schematic configuration diagram showing a semiconductor multilayer structure and a shaping optical system of a semiconductor light emitter according to a third exemplary embodiment.

Next, a semiconductor light emitter 10B according to the present exemplary embodiment will be described with reference to FIG. 21. FIG. 21 is a schematic configuration diagram showing a semiconductor multilayer structure 20 and a shaping optical system 12B of the semiconductor light emitter 10B. The same reference numbers are assigned to the same components as components of the semiconductor light emitter 10 according to the first exemplary embodiment, and the description of the same components will be omitted.

As shown in FIG. 21, the semiconductor light emitter 10B includes a plurality of semiconductor multilayer structures 20 and the shaping optical system 12B. The plurality of semiconductor multilayer structures 20 are disposed such that longitudinal directions of respective light emission units are parallel to each other. The shaping optical system 12B includes a plurality of cylindrical lenses 71 corresponding to each of the plurality of semiconductor multilayer structures 20 and one positive lens 75 that forms, at the image formation position P, images of luminous fluxes that are emitted from the plurality of semiconductor multilayer structures 20 and transmit the cylindrical lens 71 with the center of the plurality of semiconductor multilayer structures 20 as an optical axis. In the example shown in FIG. 21, among the three semiconductor multilayer structures 20 disposed in upper, middle, and lower stages, the optical axis of the semiconductor multilayer structure 20 in the middle stage is configured to be the optical axis of the entire semiconductor light emitter 10B.

Even with such a configuration, the light output of the plurality of semiconductor multilayer structures 20 can be focused on one point. Therefore, the light output can be improved as compared with the case where only one semiconductor multilayer structure 20 is provided.

Although various typical exemplary embodiments of the present invention have been described above, the present invention is not limited to the various exemplary embodiments and can be appropriately modified without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A semiconductor light emitter comprising:
    a substrate;
    a semiconductor multilayer structure including a light emission unit that emits light in an oblique direction with respect to the substrate in an emission region in a longitudinal direction and a lateral direction orthogonal to the longitudinal direction, wherein the semiconductor multilayer structure extends in the longitudinal direction; and
    a shaping optical system that shapes a luminous flux emitted from the light emission unit,
    wherein a lens closest to the light emission unit in the shaping optical system is a cylindrical lens having positive power in the lateral direction,
    a front major plane of the cylindrical lens is parallel to the light emission unit and a generatrix direction of the cylindrical lens is parallel to the longitudinal direction, and
    the following conditional equation (1) is satisfied in a case where
        a distance from the light emission unit to a light incident surface of the cylindrical lens is D,
        a distance from the light incident surface to the front major plane of the cylindrical lens is HA, and
        a focal length of the cylindrical lens is f, $$D < f - HA \qquad (1).$$

2. The semiconductor light emitter according to claim 1, wherein the semiconductor multilayer structure includes a light amplification unit that propagates the light in the longitudinal direction to amplify the light.

3. The semiconductor light emitter according to claim 2, wherein in a case where a length of the light emission unit in the longitudinal direction is L, and a total angle at half maximum of a luminous flux emitted from the light emission unit in the lateral direction is θw, the following conditional equation (2) is satisfied, $$f<L/(2\times\tan(\theta w/2)) \tag{2}$$

4. The semiconductor light emitter according to claim 3, wherein in a case where a length of the light emission unit in the longitudinal direction is L, and a total angle at half maximum of a luminous flux emitted from the light emission unit in the lateral direction is θw, the following conditional equation (3) is satisfied, $$0.4L<2\times f\times\tan(\theta w/2)<L \tag{3}$$

5. The semiconductor light emitter according to claim 4, wherein an end portion on one side of the cylindrical lens in the longitudinal direction is offset with respect to an end portion on one side of the light emission unit in the longitudinal direction.

6. The semiconductor light emitter according to claim 3, wherein an end portion on one side of the cylindrical lens in the longitudinal direction is offset with respect to an end portion on one side of the light emission unit in the longitudinal direction.

7. The semiconductor light emitter according to claim 3, further comprising:

a plurality of semiconductor multilayer structures, wherein the plurality of semiconductor multilayer structures are disposed such that longitudinal directions of respective light emission units are parallel to each other, and the shaping optical system includes a positive lens that forms images of luminous fluxes emitted from the plurality of the semiconductor multilayer structures with a center of the plurality of the semiconductor multilayer structures as an optical axis.

8. The semiconductor light emitter according to claim 2, wherein an end portion on one side of the cylindrical lens in the longitudinal direction is offset with respect to an end portion on one side of the light emission unit in the longitudinal direction.

9. The semiconductor light emitter according to claim 2, further comprising:

a plurality of semiconductor multilayer structures, wherein the plurality of semiconductor multilayer structures are disposed such that longitudinal directions of respective light emission units are parallel to each other, and the shaping optical system includes a positive lens that forms images of luminous fluxes emitted from the plurality of the semiconductor multilayer structures with a center of the plurality of the semiconductor multilayer structures as an optical axis.

10. The semiconductor light emitter according to claim 1, wherein in a case where a length of the light emission unit in the longitudinal direction is L, and a total angle at half maximum of a luminous flux emitted from the light emission unit in the lateral direction is θw, the following conditional equation (2) is satisfied, $$f<L/(2\times\tan(\theta w/2)) \tag{2}$$

11. The semiconductor light emitter according to claim 10, wherein in a case where a length of the light emission unit in the longitudinal direction is L, and a total angle at half maximum of a luminous flux emitted from the light emission unit in the lateral direction is θw, the following conditional equation (3) is satisfied, $$0.4L<2\times f\times\tan(\theta w/2)<L \tag{3}$$

12. The semiconductor light emitter according to claim 11, wherein an end portion on one side of the cylindrical lens in the longitudinal direction is offset with respect to an end portion on one side of the light emission unit in the longitudinal direction.

13. The semiconductor light emitter according to claim 10, wherein an end portion on one side of the cylindrical lens in the longitudinal direction is offset with respect to an end portion on one side of the light emission unit in the longitudinal direction.

14. The semiconductor light emitter according to claim 10, further comprising:

a plurality of semiconductor multilayer structures, wherein the plurality of semiconductor multilayer structures are disposed such that longitudinal directions of respective light emission units are parallel to each other, and the shaping optical system includes a positive lens that forms images of luminous fluxes emitted from the plurality of the semiconductor multilayer structures with a center of the plurality of the semiconductor multilayer structures as an optical axis.

15. The semiconductor light emitter according to claim 1, wherein an end portion on one side of the cylindrical lens in the longitudinal direction is offset with respect to an end portion on one side of the light emission unit in the longitudinal direction.

16. The semiconductor light emitter according to claim 1, further comprising:

a plurality of semiconductor multilayer structures, wherein the plurality of semiconductor multilayer structures are disposed such that longitudinal directions of respective light emission units are parallel to each other, and the shaping optical system includes a positive lens that forms images of luminous fluxes emitted from the plurality of the semiconductor multilayer structures with a center of the plurality of the semiconductor multilayer structures as an optical axis.

17. The semiconductor light emitter according to claim 1, further comprising:

a plurality of semiconductor multilayer structures, wherein the shaping optical system includes a plurality of cylindrical lenses corresponding to each of the plurality of the semiconductor multilayer structures and a plurality of positive lenses that form images of luminous fluxes emitted from the plurality of cylindrical lenses, and the plurality of the semiconductor multilayer structures are disposed such that image formation positions of the luminous fluxes emitted from the semiconductor multilayer structures match.

18. The semiconductor light emitter according to claim 1, wherein the shaping optical system includes the cylindrical lens and a positive lens that forms an image of the luminous flux emitted from the cylindrical lens, and an aperture is provided between the cylindrical lens and the positive lens.

19. The semiconductor light emitter according to claim 1, wherein at least one lens in the shaping optical system has a size that allows only main-diffraction light in the luminous flux emitted from the semiconductor multi-layer structure to transmit.

20. The semiconductor light emitter according to claim 1, wherein the shaping optical system includes a wavelength filter.

* * * * *